United States Patent
Kudo et al.

(10) Patent No.: US 11,079,223 B2
(45) Date of Patent: Aug. 3, 2021

(54) ABSOLUTE ROTARY ENCODER AND APPARATUS

(71) Applicant: CANON PRECISION INC., Hirosaki (JP)

(72) Inventors: Kousuke Kudo, Hirosaki (JP); Ryo Sasaki, Sagamihara (JP)

(73) Assignee: Canon Precision, Inc., Aomori-ken (JP)

( * ) Notice: Subject to any disclaimer, the term of this patent is extended or adjusted under 35 U.S.C. 154(b) by 73 days.

(21) Appl. No.: 16/695,002

(22) Filed: Nov. 25, 2019

(65) Prior Publication Data
US 2020/0173774 A1   Jun. 4, 2020

(30) Foreign Application Priority Data
Dec. 3, 2018 (JP) .............................. JP2018-226384

(51) Int. Cl.
*G01B 21/20* (2006.01)
*G01B 21/04* (2006.01)
(Continued)

(52) U.S. Cl.
CPC .......... *G01B 21/20* (2013.01); *G01B 21/045* (2013.01); *G01D 5/2053* (2013.01);
(Continued)

(58) Field of Classification Search
CPC .... G01B 21/20; G01B 21/045; G01D 5/2053; G01D 5/2086; G01D 5/24471;
(Continued)

(56) References Cited

U.S. PATENT DOCUMENTS

| 2011/0155895 A1* | 6/2011 | Nagura | G01D 5/36 250/231.14 |
| 2012/0153135 A1* | 6/2012 | Ishizuka | G01D 5/24476 250/231.18 |

(Continued)

FOREIGN PATENT DOCUMENTS

| DE | 102014015978 A1 | 4/2015 |
| EP | 2343510 A2 | 7/2011 |

(Continued)

OTHER PUBLICATIONS

Extended European Search Report, dated Apr. 14, 2020, Application No. 19210840.5.

*Primary Examiner* — Alexander Satanovsky
(74) *Attorney, Agent, or Firm* — Canon U.S.A., Inc. IP Division

(57) ABSTRACT

An encoder comprises first and second sensors which reads first and second tracks, the first and second sensors being arranged in a radial direction to face each other, and a processor which generates a first position signal based on first and second periodic signals based on a signal obtained by reading the first and second tracks by the first sensor, and generates a second position signal based on third and fourth periodic signals based on a signal obtained by reading the first and second tracks by the second sensor, wherein the processor generates an absolute position signal indicating an absolute position of at least one of the scale, the first sensor, or the second sensor based on the first and second position signals and the first and third periodic signals.

10 Claims, 17 Drawing Sheets

(51) Int. Cl.
*G01D 5/20* (2006.01)
*G01D 5/244* (2006.01)
*G01D 5/245* (2006.01)
*G01D 5/36* (2006.01)
*G06F 17/17* (2006.01)

(52) U.S. Cl.
CPC ......... *G01D 5/2086* (2013.01); *G01D 5/2452* (2013.01); *G01D 5/24471* (2013.01); *G01D 5/36* (2013.01); *G06F 17/17* (2013.01)

(58) Field of Classification Search
CPC .... G01D 5/2452; G01D 5/36; G01D 5/24476; G01D 5/34792; G06F 17/17
See application file for complete search history.

(56) References Cited

U.S. PATENT DOCUMENTS

2015/0115142 A1 4/2015 Yonezawa
2018/0094924 A1* 4/2018 Horiguchi ................ G01D 5/12

FOREIGN PATENT DOCUMENTS

| | | |
|---|---|---|
| EP | 2466266 A2 | 6/2012 |
| EP | 3301401 A1 | 4/2018 |
| JP | 2018-059714 A | 4/2018 |

* cited by examiner

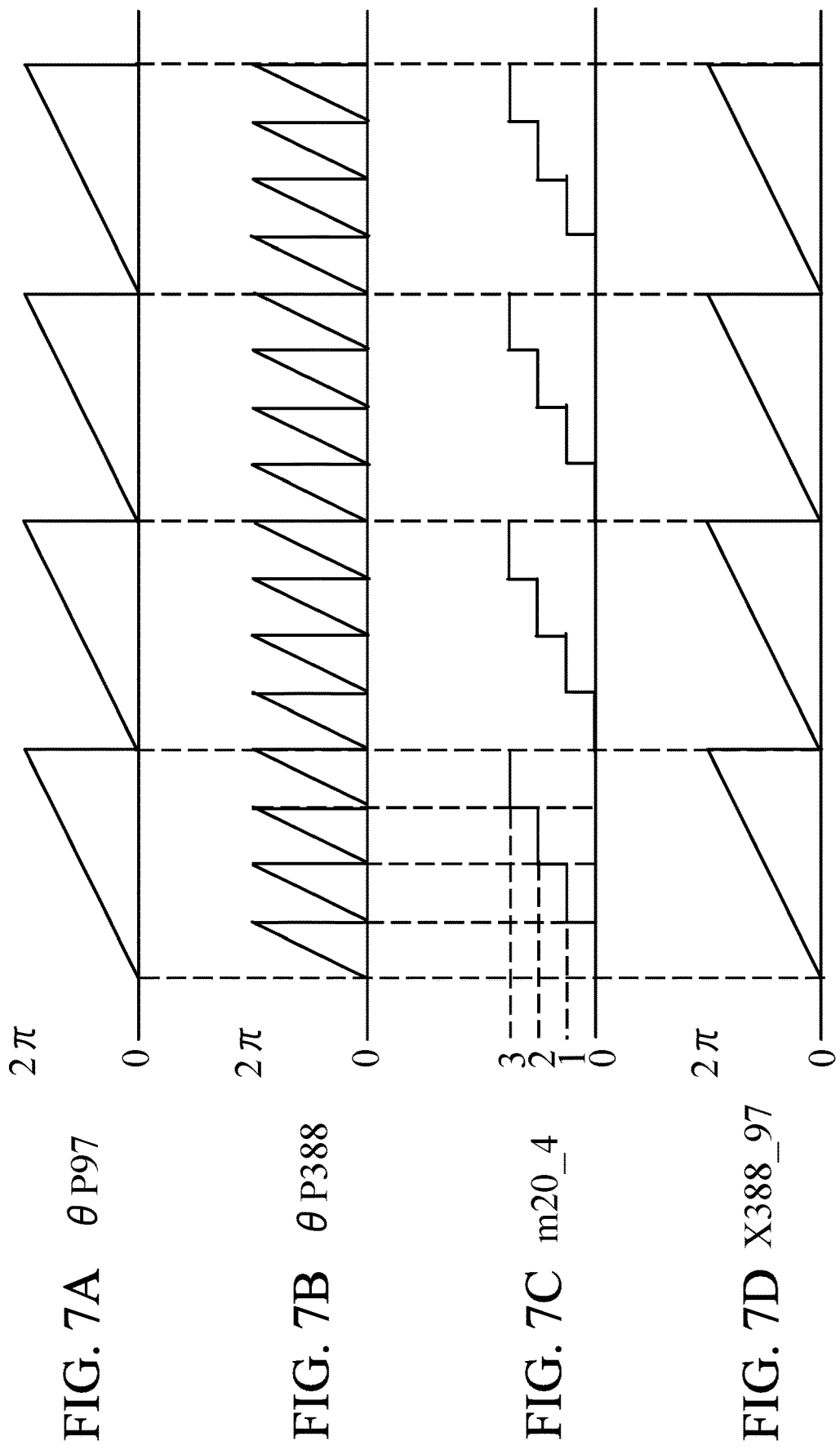

ABSOLUTE ROTARY ENCODER AND APPARATUS

BACKGROUND OF THE INVENTION

Field of the Invention

The present invention relates to an absolute rotary encoder.

Description of the Related Art

Conventionally, an absolute rotary encoder which generates two sets of two-phase signals from two periodic patterns having different periods, and detects an absolute position of a scale or a sensor from a difference (phase difference) between a phase of one set of two-phase signals and a phase of the other set of two-phase signals is known. However, in the absolute rotary encoder, in order to detect the absolute position with high accuracy, it is necessary to take measures against decentering when the scale is decentered with respect to a rotational shaft of the scale. Japanese Laid-Open Patent Publication No. 2018-059714 discloses an absolute rotary encoder that extracts a decentering component by taking a difference between an absolute angle signal with the decentering component canceled and an absolute angle signal having the decentering component.

In the absolute rotary encoder disclosed in Japanese Patent Application Laid-Open No. 2018-059714, the decentering component can be extracted, but the decentering component cannot be corrected and the attachment allowable range cannot be expanded.

SUMMARY OF THE INVENTION

The present invention provides an absolute rotary encoder capable of expanding the allowable mounting range.

An absolute rotary encoder according to one aspect of the present invention includes: a scale on which a first track and a second track are provided with different diameters from each other; a first sensor configured to move relative to the scale and read the first track and the second track; a second sensor arranged so as to face the first sensor in a radial direction of the scale and configured to move relative to the scale and read the first track and the second track; and a processor configured to generate a first position signal by taking a difference between a first periodic signal based on a signal obtained by reading the first track by the first sensor and a second periodic signal based on a signal obtained by reading the second track by the first sensor, and generates a second position signal by taking a difference between a third periodic signal based on a signal obtained by reading the first track by the second sensor and a fourth periodic signal based on a signal obtained by reading the second track by the second sensor, wherein the processor averages the first position signal and the second position signal to generate a third position signal, combines the third position signal and the first periodic signal to generate a fourth position signal, combines the third position signal and the third periodic signal to generate a fifth position signal, and averages the fourth position signal and the fifth position signal to generate an absolute position signal indicating an absolute position of at least one of the scale, the first sensor, or the second sensor.

An apparatus according to another aspect of the present invention includes: a movable member configured to rotate; and the absolute rotary encoder configured to detect a rotation position of the movable member.

Further features of the present invention will become apparent from the following description of exemplary embodiments with reference to the attached drawings.

BRIEF DESCRIPTION OF THE DRAWINGS

FIGS. 7A-7D are diagrams illustrating an example of signal processing according to the first embodiment.

DESCRIPTION OF THE EMBODIMENTS

Figure 1:
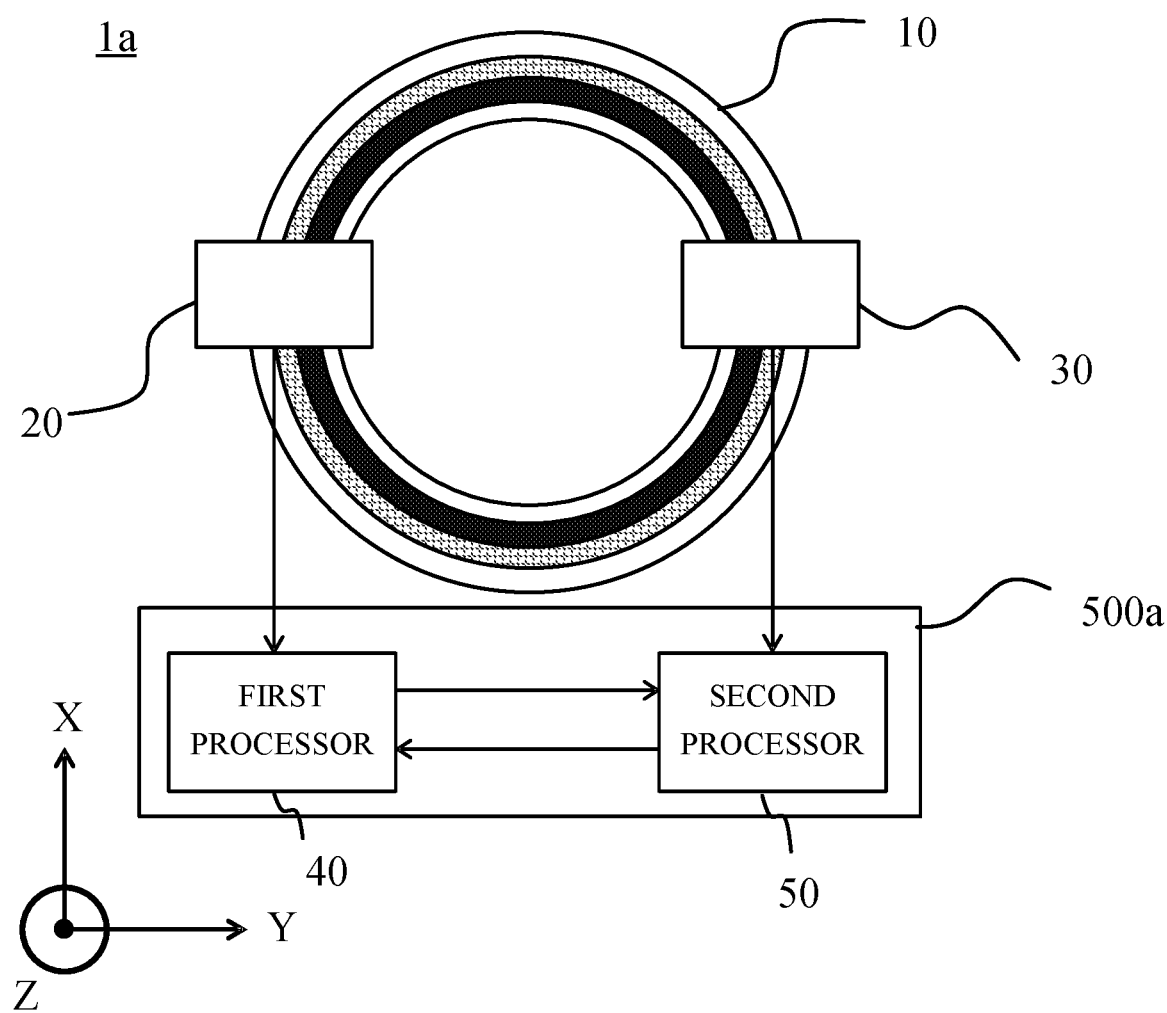
FIG. 1 is a diagram illustrating a configuration of an encoder according to the first embodiment.

Hereinafter, embodiments of the present invention will be described with reference to the drawings. In each drawing, the same members are denoted by the same reference numerals, and redundant description is omitted.

An absolute rotary encoder described in each embodiment is used in various apparatuses such as an optical apparatus, and can detect an absolute position of a movable member in accordance with a relative movement between a scale and a sensor according to a movement of the movable member in the apparatus.

First Embodiment

FIG. 1 is a diagram illustrating a configuration of an encoder 1a according to this embodiment. The encoder 1a includes a scale 10, a sensor (first sensor) 20, a sensor (second sensor) 30, and a processor 500a. The processor 500a includes a first processor 40 and a second processor 50. The encoder 1a is a reflective optical absolute rotary encoder that detects the absolute position of the movable member. In this embodiment, a case will be described in which the encoder 1a detects a rotation position (rotation angle) of a rotational shaft (not shown) of the movable member as the absolute position.

In this embodiment, the reflective optical absolute rotary encoder will be described as an example of the encoder 1a, but the present invention is not limited to this. The present invention is also applicable to encoders having different detection methods, such as a transmissive optical absolute rotary encoder, a magnetic absolute rotary encoder, and an electromagnetic induction magnetic absolute rotary encoder.

The scale 10 is attached so as to rotate integrally with the rotational shaft of the movable member. The sensors 20 and 30 are attached to a fixed member. The sensors 20 and 30 are movable relative to the scale 10 and are attached to face each other in a radial direction of the scale 10. The scale 10 may be attached to the fixed member, and the sensors 20 and 30 may be attached to the rotational shaft of the movable member so as to face each other.

Figure 2:
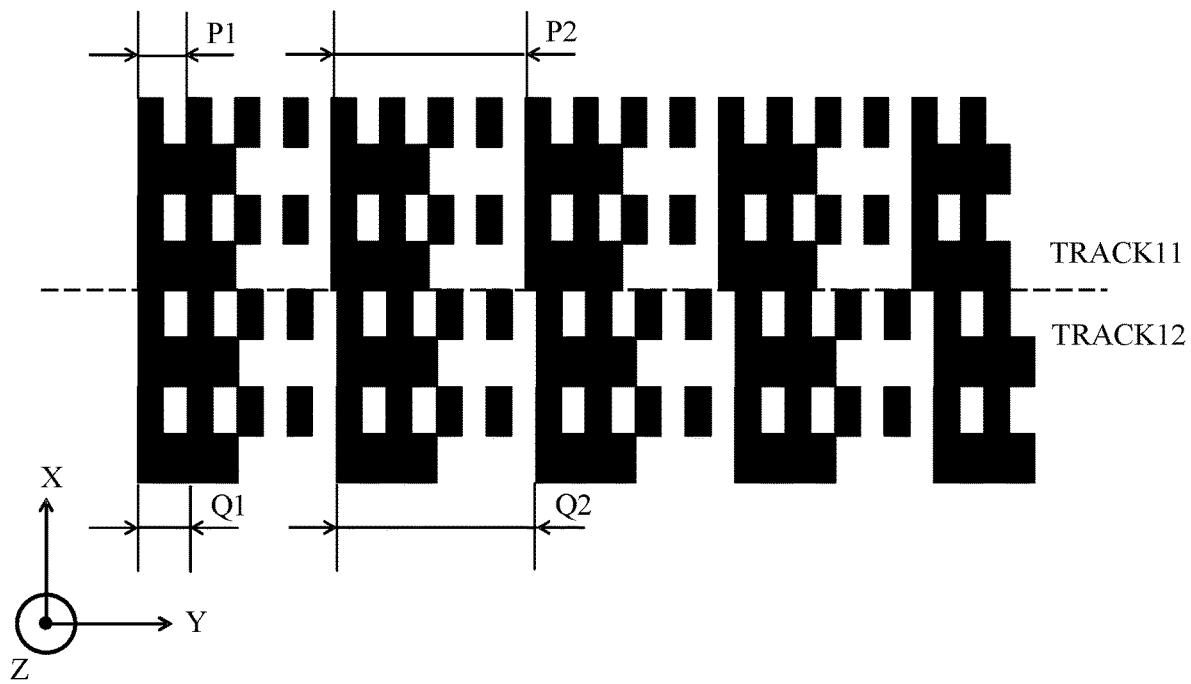
FIG. 2 is a diagram illustrating tracks provided on a scale according to the first embodiment.

FIG. 2 is an enlarged view of a part of the scale 10 and shows a plurality of (two in this embodiment) tracks 11 and 12 provided on the scale 10 with different diameters. Each track is provided with a periodic pattern including reflective portions (black portions in the drawing) and non-reflecting portions (white portions in the drawing) that are alternately arranged at a constant period (pitch). In addition, a plurality of (two in this embodiment) periodic patterns having different pitches are alternately provided in each track along a direction orthogonal to a detection direction (hereinafter referred to as a scale width direction). Specifically, the track 11 is provided with a periodic pattern with a pitch P1 and a periodic pattern with a pitch P2 alternately along the scale width direction. The number of gratings of the periodic pattern with the pitches P1 and P2 is 1649 and 388, respectively. The track 12 is provided with a periodic pattern with a pitch Q1 and a periodic pattern with a pitch Q2 alternately along the scale width direction. The number of gratings of the periodic patterns with the pitches Q1 and Q2 is 1632 and 384, respectively. The number of gratings of the periodic pattern with the pitch P1 and the number of gratings of the periodic patterns with the pitch Q1 are substantially equal, and the number of gratings of the periodic pattern with the pitch P2 and the number of gratings of the periodic patterns with the pitch Q2 are substantially equal.

Figure 3:
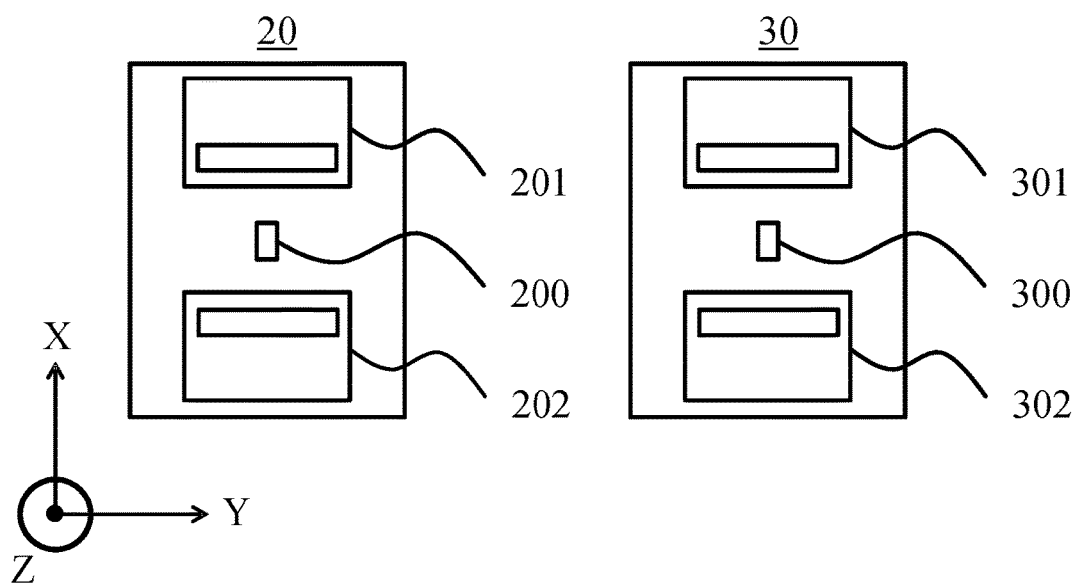
FIG. 3 is a diagram illustrating a configuration of a sensor according to the first embodiment.

FIG. 3 is a diagram illustrating a configuration of the sensors 20 and 30. The sensor 20 includes a light source 200 and a plurality of (two in this embodiment) light-receiving portions (detectors) 201 and 202. The light source 200 and the light-receiving portions 201 and 202 are arranged on the same plane. The light source 200 is configured by a light-emitting element such as an LED. The light-receiving portion 201 is configured by a plurality of photoelectric conversion elements (light-receiving elements) that photoelectrically convert light emitted from the light source 200 and reflected by a reflective portion of the track 11. The light-receiving portion 202 is configured by a plurality of photoelectric conversion elements (light-receiving elements) that photoelectrically convert light emitted from the light source 200 and reflected by a reflective portion of the track 12. When the scale 10 and the sensor 20 are relatively displaced, an intensity of the reflected light received by the light-receiving elements in the light-receiving portions 201 and 202 changes according to the relative displacement amount. The sensor 20 outputs a sine wave signal corresponding to the change in the light-receiving intensity in the light-receiving portion 201 and outputs a sine wave signal corresponding to the change in the light-receiving intensity in the light-receiving portion 202. Although the configuration of the sensor 20 has been described above, a sensor 30 is described by replacing the light source 200 described above with a light source 300 and the light-receiving portions 201 and 202 with light-receiving portions 301 and 302.

Next, switching of a detection cycle will be described with reference to FIGS. 4A to 4C. The switching of the detection cycle is performed by changing the light-receiving elements that outputs signals A(+), B(+), A(−), and B(−).

Figure 4A:
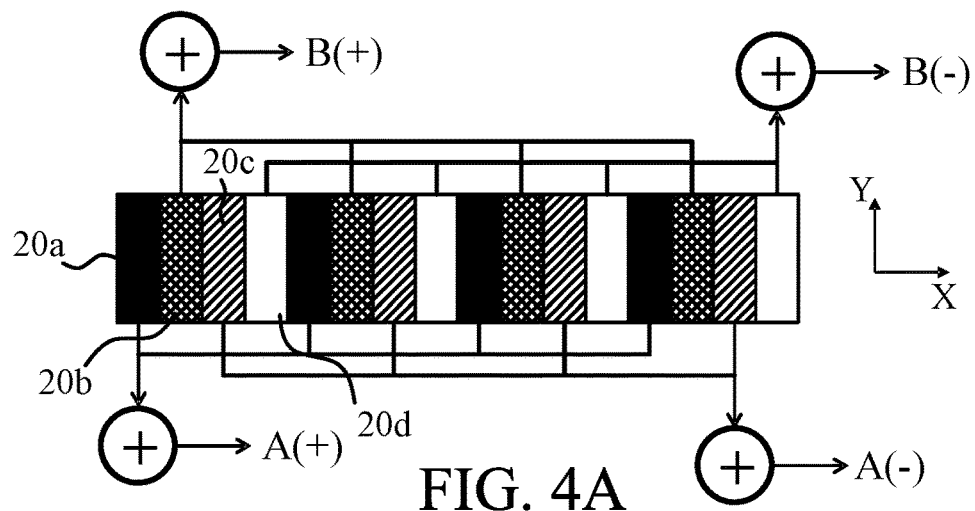
FIGS. 4A-4C are explanatory diagrams of switching of a detection cycle in the first embodiment.

FIG. 4A shows a configuration of the light-receiving portion when the light-receiving portion 201 reads the periodic pattern with the pitch P1 or the light-receiving portion 202 reads the periodic pattern with the pitch Q1. In this case, the detection cycle is the pitch P1 or the pitch Q1, and outputs of the light-receiving elements 20a, 20b, 20c, and 20d are treated as signals A(+), B(+), A(−), and B(−), respectively.

Figure 4B:
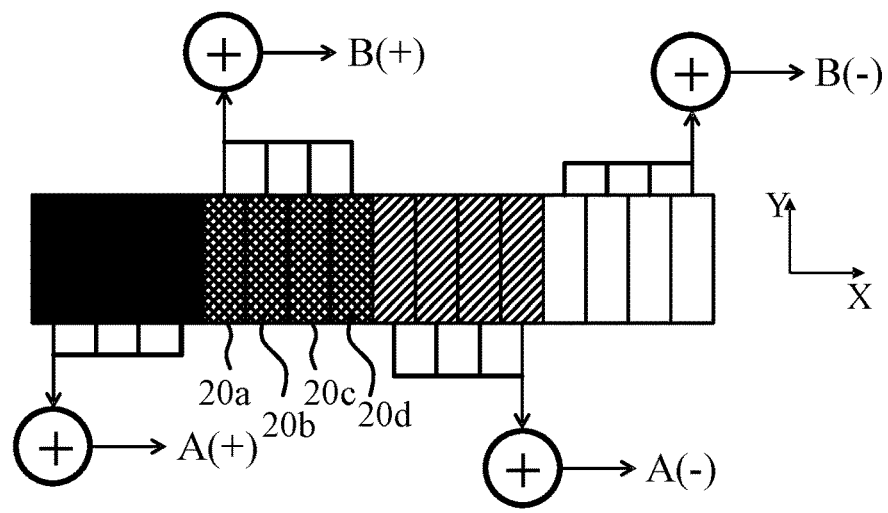

FIG. 4B shows a configuration of the light-receiving portion when the light-receiving portion 201 reads the periodic pattern with the pitch P2 or the light-receiving portion 202 reads the periodic pattern with the pitch Q2. In this case, the detection cycle is the pitch P2 or the pitch Q2, and sixteen light-receiving elements arranged along a position detection direction are set as a set for every four adjacent ones, and outputs of each set are treated as signals A(+), B(+), A(−), B(−).

By performing processing expressed by A=A(+)−A(−) and B=B(+)−B(−) for the signals A(+), B(+), A(−), and B(−), two-phase pseudo sine wave signals A and B having different phases are generated.

Figure 4C:
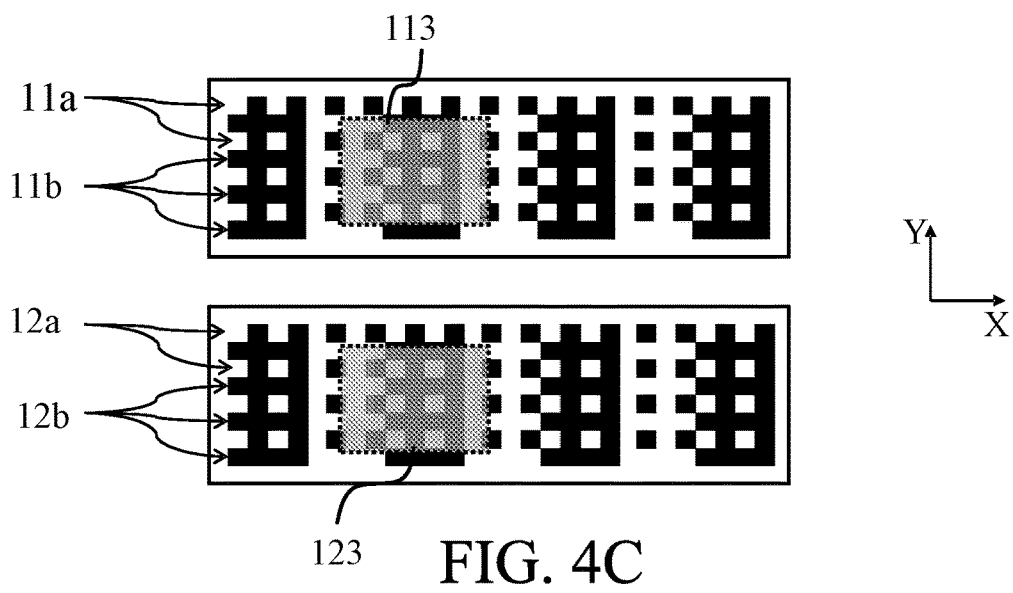

FIG. 4C shows a reading area on the scale 10 of the sensor 20. When the detection cycle is set to the pitch P1, the light-receiving portion 201 reads the periodic pattern 11a with the pitch P1. In this case, two-phase pseudo sine wave signals (two-phase signals of P1) having a phase difference of about 90 degrees from each other corresponding to the pitch P1 are output. When the detection cycle is set to the pitch P2, the light-receiving portion 201 reads the periodic pattern 11b with the pitch P2. In this case, two-phase pseudo sine wave signals (two-phase signals of P2) having a phase difference of about 90 degrees from each other corresponding to the pitch P2 are output.

When the detection cycle is set to the pitch Q1, the light-receiving portion 202 reads the periodic pattern 12a with the pitch Q1. In this case, two-phase pseudo sine wave signals (two-phase signals of Q1) having a phase difference of about 90 degrees from each other corresponding to the pitch Q1 are output. When the detection cycle is set to the pitch Q2, the light-receiving portion 202 reads the periodic pattern 12b with the pitch Q2. In this case, two-phase pseudo sine wave signals (two-phase signals of Q2) having a phase difference of about 90 degrees from each other corresponding to the pitch Q2 are output.

A reading area 113 on the track by the light-receiving portion 201 and a reading area 123 on the track by the light-receiving portion 202 are ranges in which the light emitted from the light source is reflected so as to be received by each light-receiving portion. Each reading area is set so as to include a plurality of combinations of two periodic patterns arranged alternately along the scale width direction in the track.

In the above description, the switching of the detection cycle of the sensor 20 has been described. However, by replacing the light-receiving portions 201 and 202 described above with light-receiving portions 301 and 302, a switching of a detection cycle of the sensor 30 is explained.

In this embodiment, the case where two-phase signals having a phase difference of about 90 degrees from each other are output from the sensor has been described. However, as described later, a three-phase signal, a triangular wave signal, or the like may be output as long as they are signals whose phase can be detected.

Figure 5:
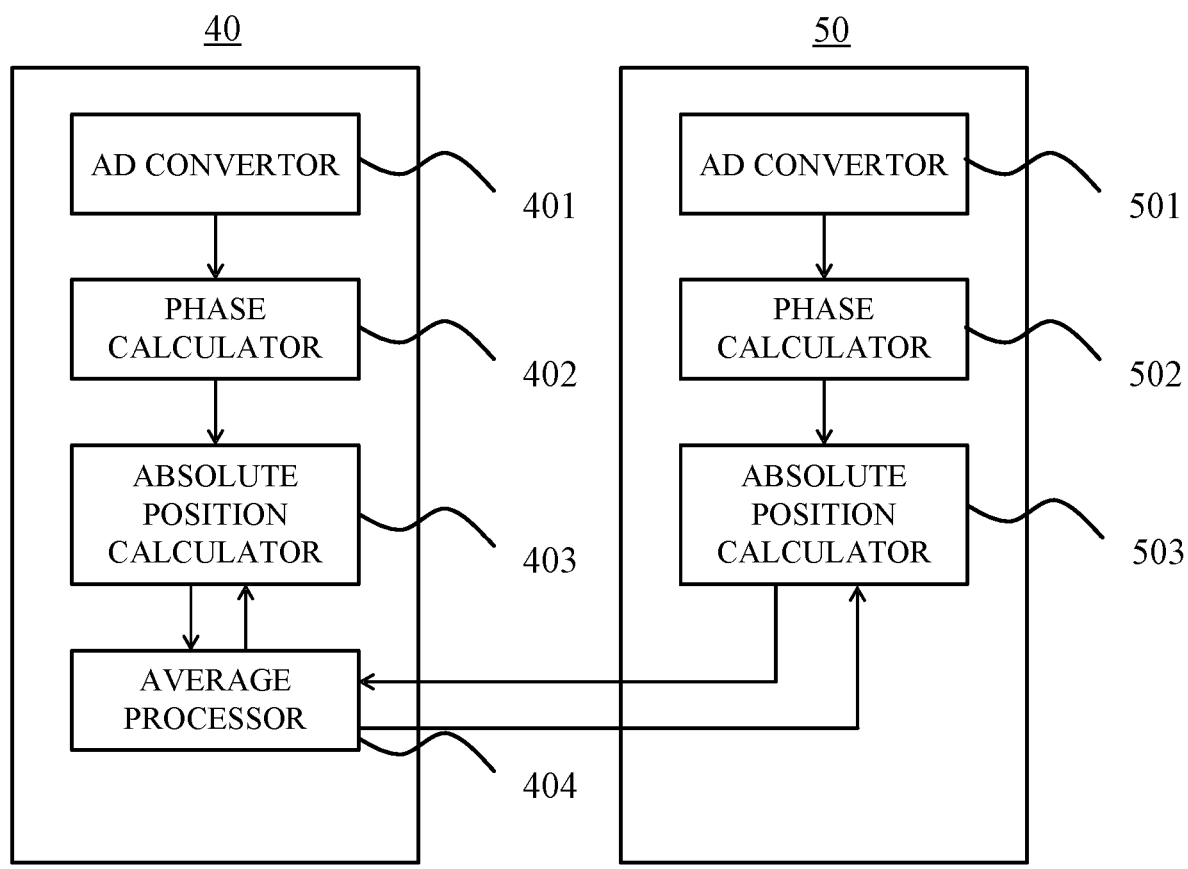
FIG. 5 is a diagram illustrating a configuration of a first processor and a second processor according to the first embodiment.

FIG. 5 is a diagram illustrating configurations of a first processor 40 and a second processor 50. The first processor 40 includes an AD converter 401, a phase calculator 402, an absolute position calculator 403, and an average processor 404. The second processor 50 includes an AD converter 501, a phase calculator 502, and an absolute position calculator 503. Hereinafter, a process performed in the first processor 40 is referred to as a first process, and a process performed in the second processor 50 is referred to as a second process.

Figure 6:
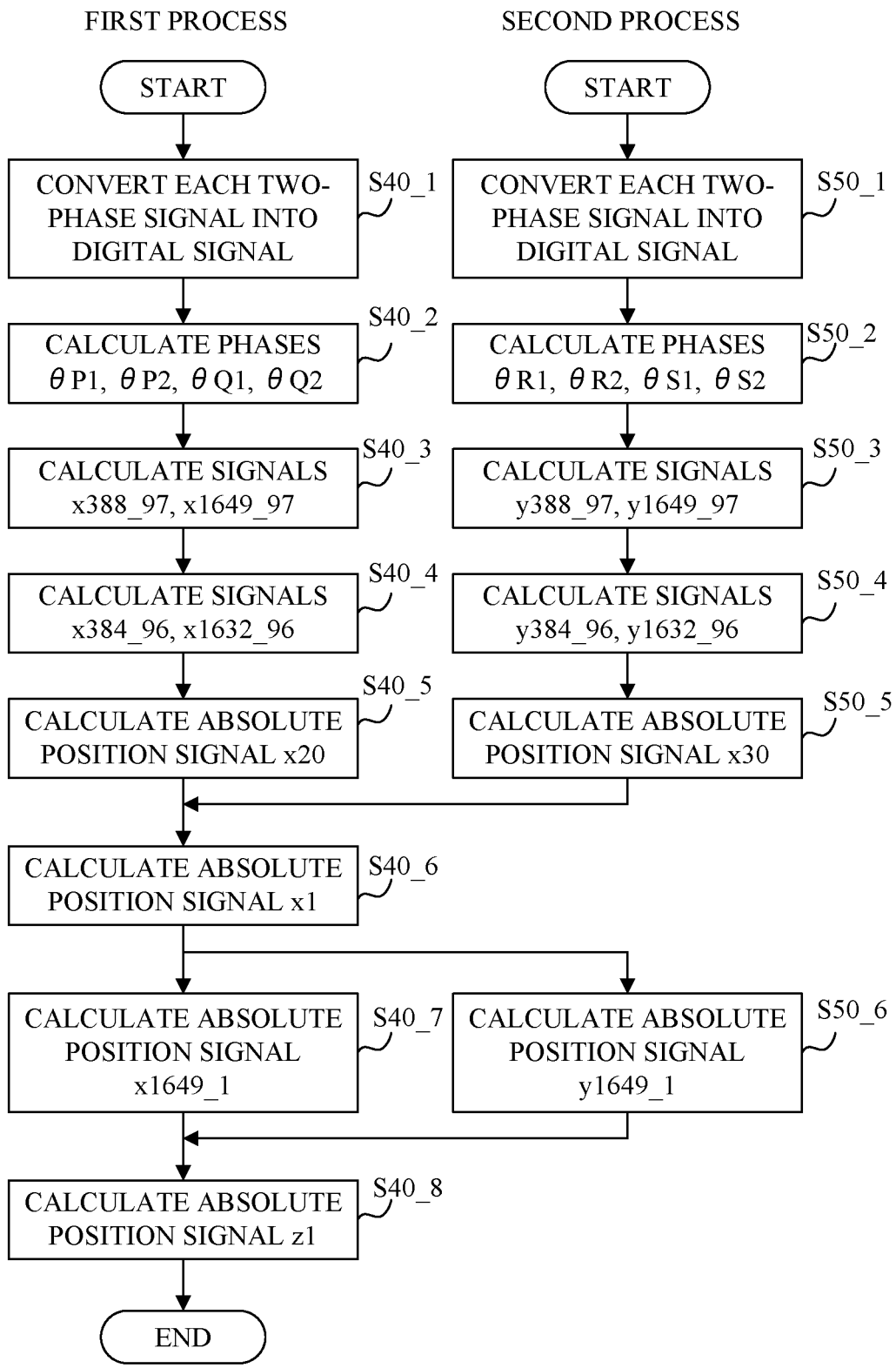
FIG. 6 is a flowchart showing a first process and a second process according to the first embodiment.

FIG. 6 is a flowchart showing the first process and the second process. The processes in steps S40_1 to S40_8 correspond to the first process, and the processes in steps S50_1 to S50_6 correspond to the second process. Firstly, the first process will be described.

In step S40_1, the AD converter 401 converts each two sets of two-phase signals (the two-phase signals of P1 and P2 and the two-phase signals of Q1 and Q2) output from the light-receiving portions 201 and 202 into digital signals.

In step S40_2, the phase calculator 402 calculates a phase from each two sets of two-phase signals converted into the digital signals by the AD converter 401. Since the two-phase signals are signals (sine wave signal and cosine wave signal) having a phase difference of about 90 degrees from each other as described above, the phase calculator 402 calculates the phase by arctan calculation. In the following description, let us assume that the phase calculated from the two-phase signals of P1 is θP1, the phase calculated from the two-phase signals of P2 is θP2, the phase calculated from the two-phase signals of Q1 is θQ1 and the phase calculated from the two-phase signals of Q2 is θQ2. As described above, the numbers of gratings of the periodic patterns with the pitches P1, P2, Q1, and Q2 are 1649, 388, 1632, and 384, respectively. Therefore, the phases θP1, θP2, θQ1, and θQ2 are a signal of 1649 periods, a signal of 388 periods, a signal 1632 periods, and a signal of 384 periods, respectively.

In this embodiment, the case where the phase is calculated by the arctan calculation has been described. However, any parameter other than the phase may be calculated as long as it represents a position within a specific range.

In step S40_3, the absolute position calculator 403 first uses the following equations (1) to (3) to calculate a signal of 97 periods (θP97), a signal of 388 periods (θP388), and a signal of 1649 periods (θP1649). Let us assume that MOD(x, y) represents a remainder when x is a dividend and y is a divisor.

$$\theta P97 = MOD(\theta P1 - 4 \times \theta P2, 2\pi) \quad (1)$$

$$\theta P388 = MOD(\theta P2, 2\pi) \quad (2)$$

$$\theta P1649 = MOD(\theta P1, 2\pi) \quad (3)$$

Here, as for an accuracy within one period of the calculated signal, the accuracy of θP1649 is the highest and the accuracy of θP97 is the lowest. Therefore, in this embodiment, the signal of 97 periods having the accuracy of θP1649 is calculated. Specifically, as shown in FIGS. 7A to 7D, θP388 changes 388 times from 0 to 2π over the entire track circumference, while θP97 changes 97 times from 0 to 2π over the entire track circumference. That is, a change amount of the phase of θP97 is ¼ of θP388.

In this embodiment, the absolute position calculator 403 calculates the period number m20_4 of θP388 and a signal x388_97 of 97 periods having an accuracy of θP388 by using the following equations (4) and (5). Let us assume that ROUND (x) represents an integer value obtained by rounding off the first decimal place of x.

$$m20\_4 = ROUND\left(\frac{4 \times \theta P97 - \theta P388}{2\pi}\right) \quad (4)$$

$$x388\_97 = \frac{m20\_4 \times 2\pi + \theta P388}{4} \quad (5)$$

Next, the absolute position calculator 403 uses the following equations (6) and (7) to calculate a period number m20_17 of θP1649 and a signal x1649_97 of 97 periods (first periodic signal) having an accuracy of θP1649.

$$m20\_17 = ROUND\left(\frac{17 \times x388\_97 - \theta P1649}{2\pi}\right) \quad (6)$$

$$x1649\_97 = \frac{m20\_17 \times 2\pi + \theta P1649}{17} \quad (7)$$

In step S40_4, the absolute position calculator 403 first uses the following equations (8) to (10) to calculate a signal of 96 periods (θQ96), a signal of 384 periods (θQ384), and a signal of 1632 periods (θQ1632).

$$\theta Q96 = MOD(\theta Q1 - 4 \times \theta Q2, 2\pi) \quad (8)$$

$$\theta Q384 = MOD(\theta Q2, 2\pi) \quad (9)$$

$$\theta Q1632 = MOD(\theta Q1, 2\pi) \quad (10)$$

Next, the absolute position calculator 403 uses the following equations (11) and (12) to calculate a period number n20_4 of θQ384 and a signal x384_96 of 96 periods having an accuracy of θQ384.

$$n20\_4 = ROUND\left(\frac{4 \times \theta Q96 - \theta Q384}{2\pi}\right) \quad (11)$$

$$x384\_96 = \frac{n20\_4 \times 2\pi + \theta Q384}{4} \quad (12)$$

Next, the absolute position calculator 403 uses the following equations (13) and (14) to calculate a period number n20_17 of θQ1632 and a signal x1632_96 of 96 periods (second periodic signal) having an accuracy of θQ1632.

$$n20\_17 = ROUND\left(\frac{17 \times x384\_96 - \theta Q1632}{2\pi}\right) \quad (13)$$

$$x1632\_96 = \frac{n20\_17 \times 2\pi + \theta Q1632}{17} \quad (14)$$

In step S40_5, an absolute position signal (first position signal) x20 in the sensor 20 that is one period around the entire track circumference is calculated by using the following equation (15).

$$x20 = \text{MOD}(x1649\_97 - x1632\_96, 2\pi) \tag{15}$$

Next, the second process will be described. In step S50_1, the AD converter 501 converts each two sets of two-phase signals (the two-phase signals of P1 and P2 and the two-phase signals of Q1 and Q2) output from the light-receiving portions 301 and 302 into digital signals.

In step S50_2, the phase calculator 502 calculates a phase from each two sets of two-phase signals converted into the digital signals by the AD converter 501. Since the two-phase signals are signals having a phase difference of about 90 degrees from each other, the phase calculator 502 calculates the phase by the arctan calculation. In the following description, let us assume that the phase calculated from the two-phase signals of P1 is θR1, the phase calculated from the two-phase signals of P2 is θR2, the phase calculated from the two-phase signals of Q1 is θS1, and the phase calculated from the two-phase signals of Q2 is θS2. The phases θR1, θR2, θS1, and θS2 are a signal of 1649 periods, a signal of 388 periods, a signal of 1632 periods, and a signal of 384 periods, respectively.

In step S50_3, the absolute position calculator 503 first uses the following equations (16) to (18) to calculate a signal of 97 periods (θR97), a signal of 388 periods (θR388), and a signal of 1649 periods (θR1649).

$$\theta R97 = \text{MOD}(\theta R1 - 4 \times \theta R2, 2\pi) \tag{16}$$

$$\theta R388 = \text{MOD}(\theta R2, 2\pi) \tag{17}$$

$$\theta R1649 = \text{MOD}(\theta R1, 2\pi) \tag{18}$$

Next, the absolute position calculator 503 calculates a period number m30_4 of θR388 and a signal y388_97 of 97 periods having an accuracy of θR388 by using the following equations (19) and (20).

$$m30\_4 = \text{ROUND}\left(\frac{4 \times \theta R97 - \theta R388}{2\pi}\right) \tag{19}$$

$$y388\_97 = \frac{m30\_4 \times 2\pi + \theta R388}{4} \tag{20}$$

Next, the absolute position calculator 503 uses the following equations (21) and (22) to calculate a period number m30_17 of θR1649 and a signal y1649_97 of 97 periods (third periodic signal) having an accuracy of θR1649.

$$m30\_17 = \text{ROUND}\left(\frac{17 \times y388\_97 - \theta R1649}{2\pi}\right) \tag{21}$$

$$y1649\_97 = \frac{m30\_17 \times 2\pi + \theta R1649}{17} \tag{22}$$

In step S50_4, the absolute position calculator 503 first uses the following equations (23) to (25) to calculate a signal of 96 periods (θS96), a signal of 384 periods (θS384), and a signal of 1632 periods (θS1632).

$$\theta S96 = \text{MOD}(\theta S1 - 4 \times \theta S2, 2\pi) \tag{23}$$

$$\theta S384 = \text{MOD}(\theta S2, 2\pi) \tag{24}$$

$$\theta S1632 = \text{MOD}(\theta S1, 2\pi) \tag{25}$$

Next, the absolute position calculator 503 calculates a period number n30_4 of θS384 and a signal y384_96 of 96 periods having an accuracy of θS384 by using the following equations (26) and (27).

$$n30\_4 = \text{ROUND}\left(\frac{4 \times \theta S96 - \theta S384}{2\pi}\right) \tag{26}$$

$$y384\_96 = \frac{n30\_4 \times 2\pi + \theta S384}{4} \tag{27}$$

Next, the absolute position calculator 503 calculates a period number n30_17 of θS1632 and a signal y1632_96 of 96 periods (fourth periodic signal) having an accuracy of θS1632 by using the following equations (28) and (29).

$$n30\_17 = \text{ROUND}\left(\frac{17 \times y384\_96 - \theta S1632}{2\pi}\right) \tag{28}$$

$$y1632\_96 = \frac{n30\_17 \times 2\pi + \theta S1632}{17} \tag{29}$$

In step S50_5, an absolute position signal (second position signal) x30 in the sensor 30 that is one period around the entire track circumference is calculated by using the following equation (30).

$$x30 = \text{MOD}(y1649\_97 - y1632\_96, 2\pi) \tag{30}$$

In step S40_6, the average processor 404 calculates an absolute position signal (third position signal) x1 by averaging the absolute position signals x20 and x30 by using the following equation (31). By performing this process, it is possible to improve decentering fluctuation tolerance. In the following description, the process for improving the decentering fluctuation tolerance is referred to as decentering correction.

$$x1 = \begin{cases} \text{MOD}\left(\frac{x20 + x30}{2}, 2\pi\right) & \text{when } x20 < x30 \\ \text{MOD}\left(\frac{x20 + x30 + 2\pi}{2}, 2\pi\right) & \text{when } x20 \geq x30 \end{cases} \tag{31}$$

Hereinafter, the improvement of the decentering fluctuation tolerance according to the present invention will be described. First, a rounding error d will be described as an index for ensuring reliability of the absolute position.

The rounding error is a difference between values before and after rounding in rounding processing when obtaining the period number. Taking the equation (4) as an example, the period number m20_4 of θP388 is acquired using ROUND(x). That is, since the rounded value by rounding off is the period number m20_4, the rounding error in the expression (4) can be acquired by subtracting the period number m20_4 from the value before rounding off (non-rounded value). The rounding error is expressed within a range of ±0.5, and if it is close to +0.5 or −0.5, it can be said that the rounding process is not performed correctly. That is, there is a high possibility that the period number is shifted and the absolute position cannot be acquired correctly.

Figure 8A:
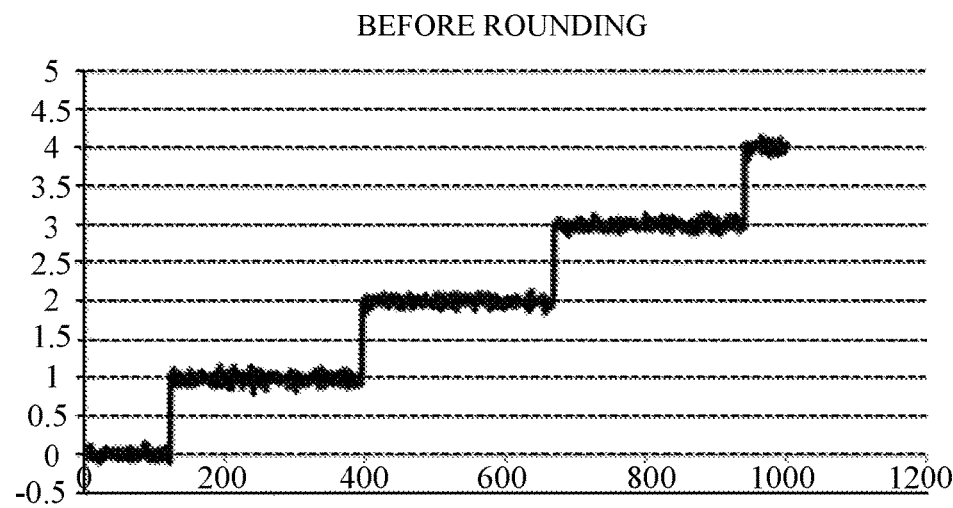
FIGS. 8A-8C are graphs showing a rounding error in a state where an absolute position is correctly acquired.
Figure 8B:
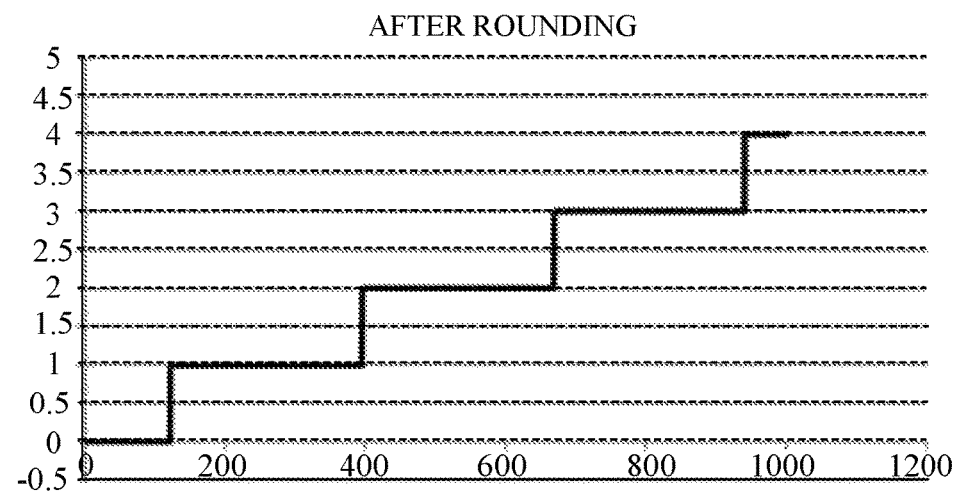
Figure 8C:
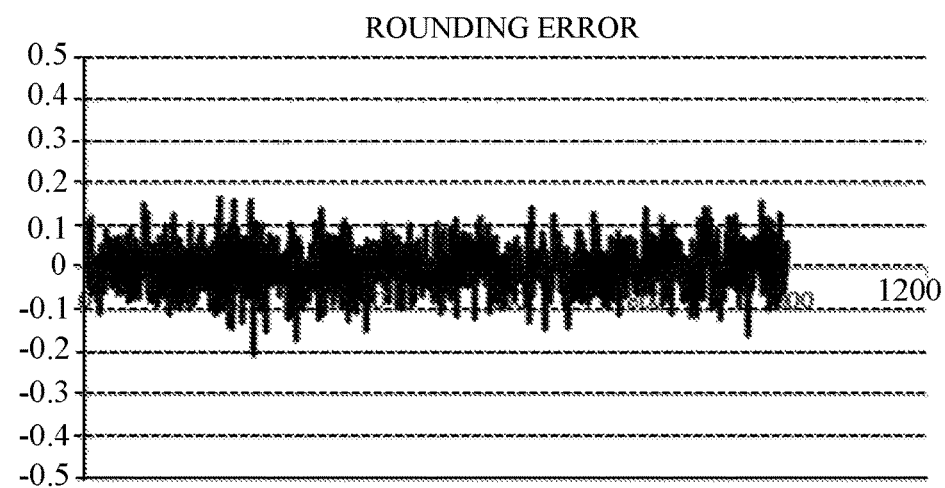
Figure 9A:
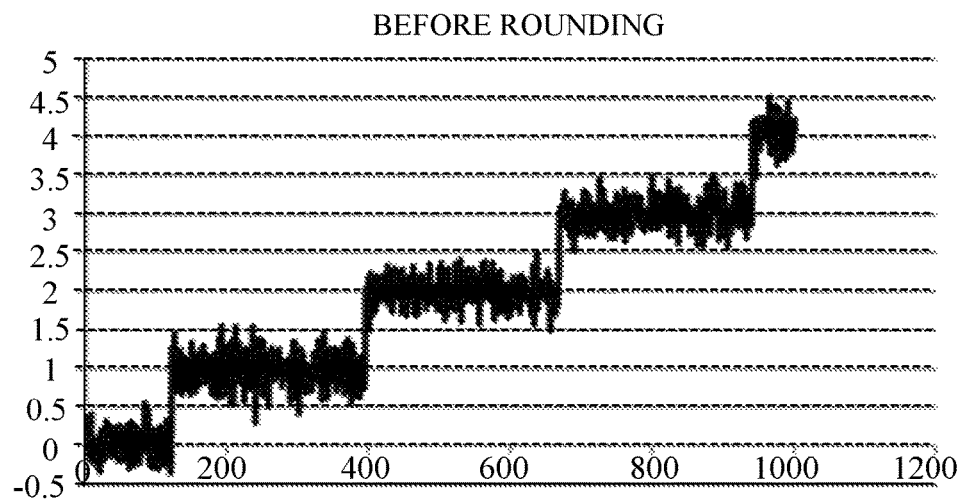
FIGS. 9A-9C are graphs showing a rounding error in a state where there is a high possibility that the absolute position is not correctly acquired.
Figure 9B:
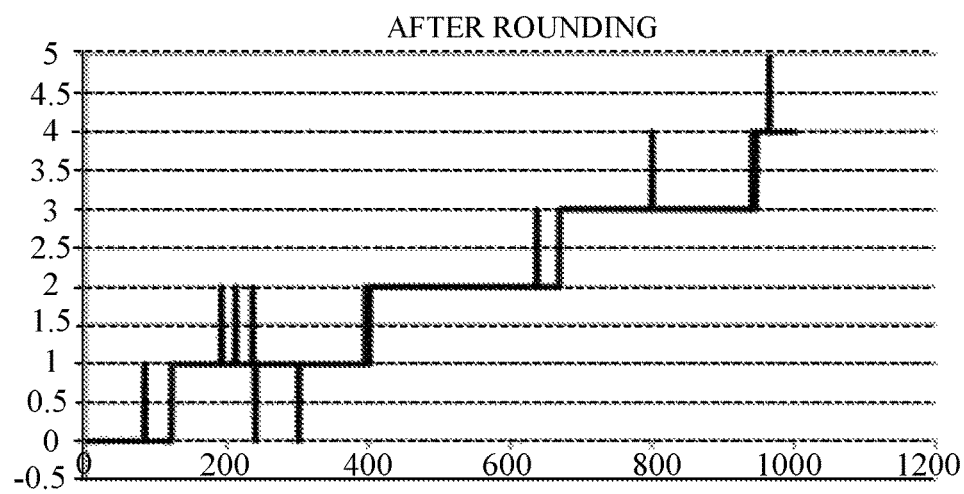
Figure 9C:
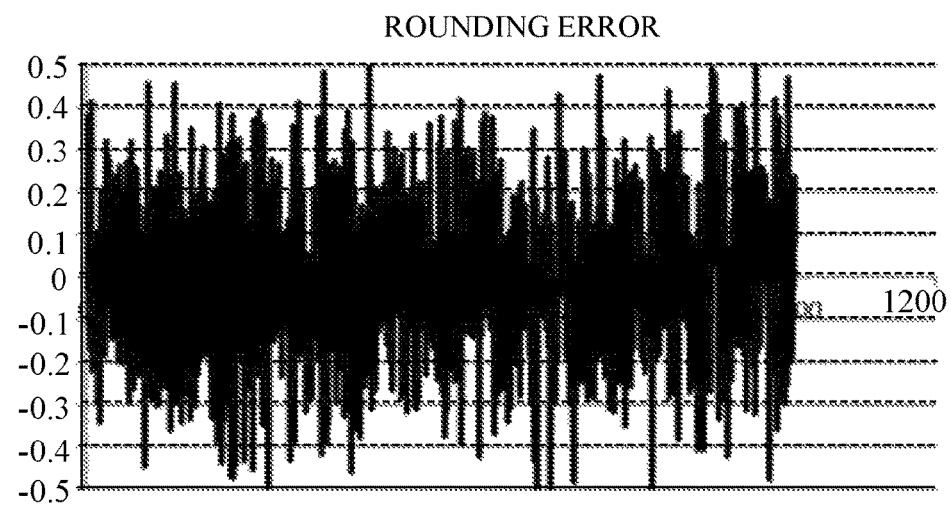

FIGS. 8A-8C are graphs showing the rounding error in a state where the absolute position is correctly acquired. FIGS. 9A to 9C are graphs showing the rounding error in a state where there is a high possibility that the absolute position is not correctly acquired. FIGS. 8A-8C and FIGS. 9A-9C show the period number before rounding off, the period number after rounding off, and a difference (rounding error) between the period numbers before and after rounding off, respectively.

Next, the rounding error when the absolute position signal is acquired without performing the decentering correction will be described. Here, a case where the absolute position signal in the sensor 20 is acquired by using the absolute position signal x20 and the signal x1649_97 acquired in the first process will be described. The rounding error d is expressed by the following equation (32).

$$d = \frac{97 \times x20 - x1649\_97}{2\pi} - \text{ROUND}\left(\frac{97 \times x20 - x1649\_97}{2\pi}\right) \quad (32)$$

The absolute position signal x20 is added with a decentering error ε0 expressed by the following equation (33). RopM and RopS represent an optical center in the track 11 and an optical center in the track 12, respectively.

$$\varepsilon_0 = \left(\frac{\varepsilon}{RopM} - \frac{\varepsilon}{RopS}\right) \times \sin\theta \quad (33)$$

Figure 10:
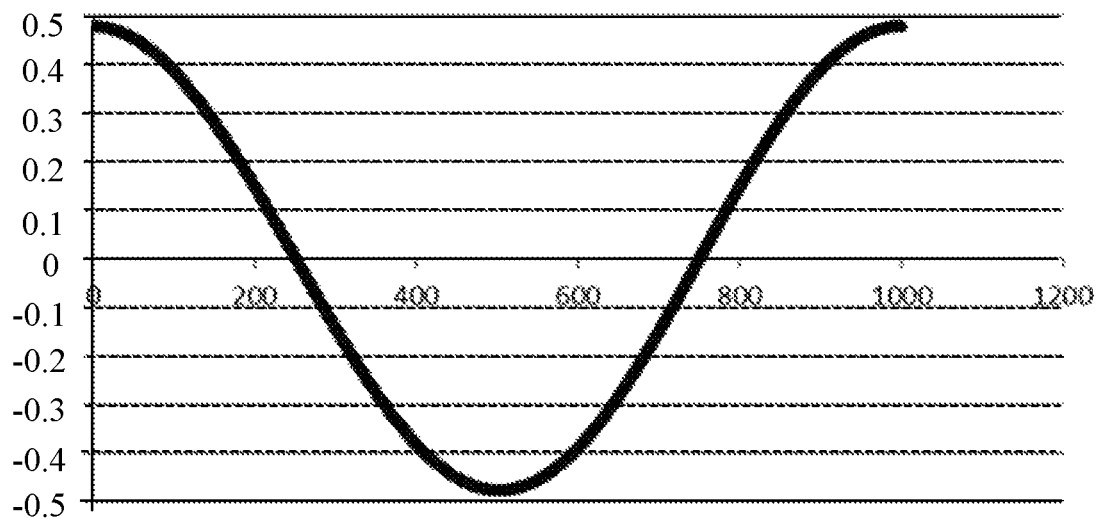
FIG. 10 is a diagram illustrating the rounding error when an absolute position signal is acquired without performing decentering correction.

In the equation (32), an error 97*ε0 is added, and the rounding error increases. An error is added to the signal x1649_97 in the same way, but it is much smaller than the error 97*ε0, and is omitted in this description. FIG. 10 is a diagram illustrating the rounding error when the absolute position signal is acquired without performing the decentering correction. As described above, when the absolute position signal is acquired without performing the decentering correction, the decentering error is added and the rounding error becomes large.

Next, the rounding error when obtaining the absolute position signal by performing the decentering correction will be described. Here, a case where the absolute position signal in the sensor 20 is acquired using the absolute position signal x1 and the signal x1649_97 acquired by the average processor 404 will be described. The rounding error d is expressed by the following equation (34).

$$d = \frac{97 \times x1 - x1649\_97}{2\pi} - \text{ROUND}\left(\frac{97 \times x1 - x1649\_97}{2\pi}\right) \quad (34)$$

A decentering error ε0 is added to the absolute position signal x1. However, since the absolute position signal x1 is an average of the absolute position signals read from the sensors 20 and 30 arranged so as to face each other (i.e. the one subjected to the decentering correction), the decentering error ε0 is expressed by the following equation (35).

$$\varepsilon_0 = \frac{\left(\frac{\varepsilon}{RopM} - \frac{\varepsilon}{RopS}\right) \times \sin\theta + \left(\frac{\varepsilon}{RopM} - \frac{\varepsilon}{RopS}\right) \times \sin(\theta + 180°)}{2} \quad (35)$$

Figure 11:
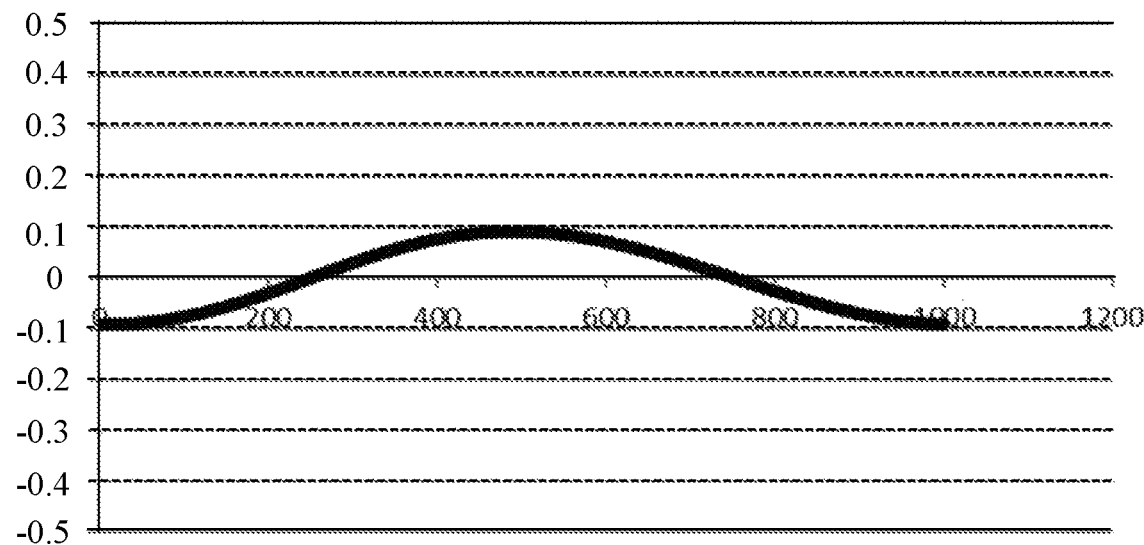
FIG. 11 is a diagram showing the rounding error when the absolute position signal is acquired by performing the decentering correction.

It is clear that the error ε0 is 0 because sin θ and sin(θ+180°) are added. Therefore, by performing the decentering correction, the decentering error ε0 can be removed, and the rounding error can be prevented from becoming large. FIG. 11 is a diagram illustrating the rounding error when the absolute position signal is acquired by performing the decentering correction.

Figure 12:
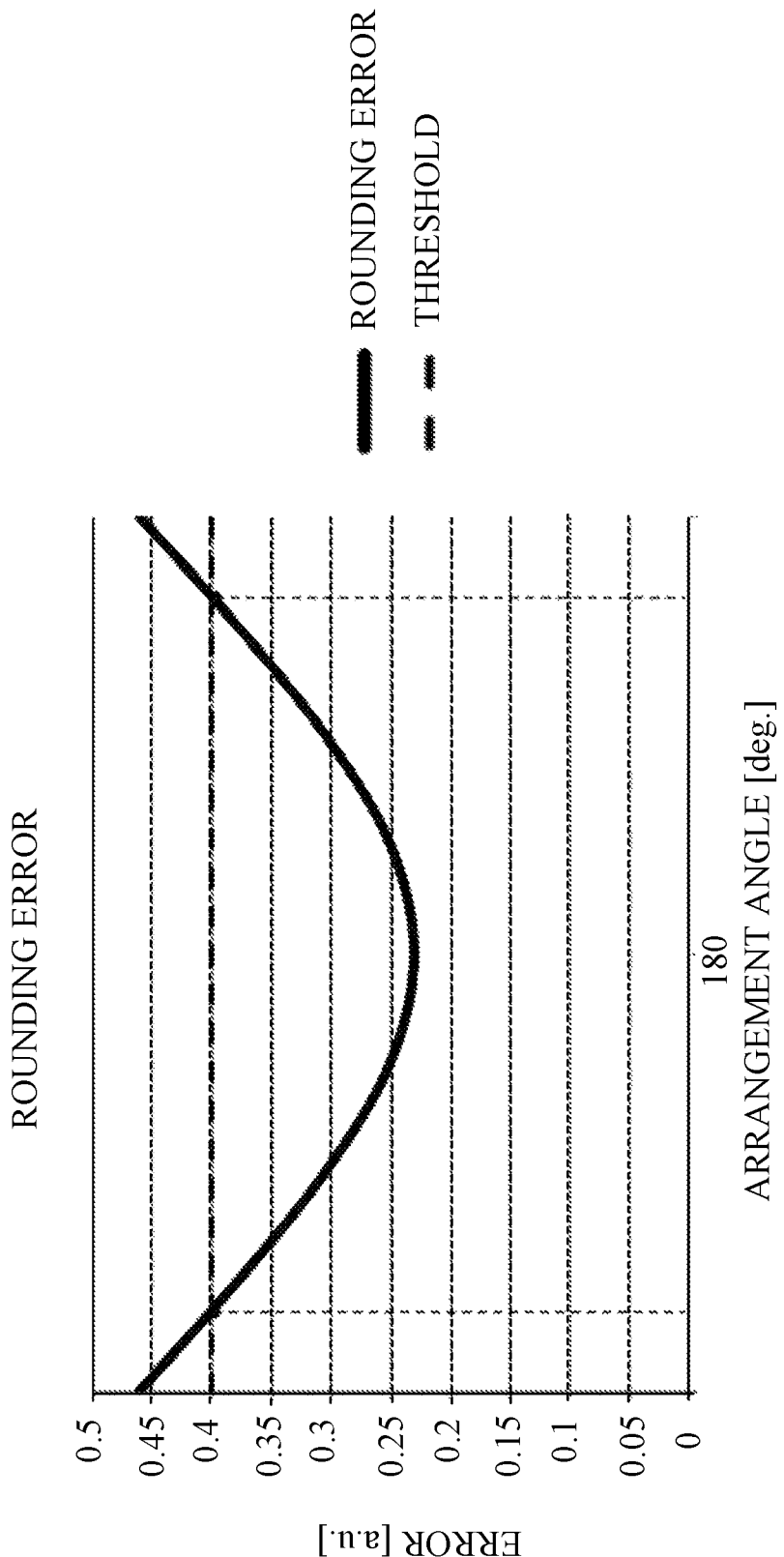
FIG. 12 is a diagram showing a relationship between an opposing arrangement angle and the rounding error.

Hereinafter, the opposing arrangement angle of the sensors 20 and 30 will be described with reference to FIG. 12. FIG. 12 is a diagram showing a relationship between the opposing arrangement angle of the sensors 20 and 30 and the rounding error. The arrangement angle in the diagram means an angle formed by the sensors 20 and 30 with respect to a radial center of the scale 10 on a plane including a radial direction of the scale 10. The opposing arrangement angle is set within a range where the rounding error does not exceed a threshold. In this embodiment, in consideration of the reliability of the absolute position, the threshold of the rounding error is set to 0.4. However, since the rounding error changes according to a decentering amount, the graph curve in FIG. 12 is merely an example.

After the process of step S40_6, the absolute position signal x1 is processed by the absolute position calculators 403 and 503 to calculate a more accurate absolute position signal. In step S40_7, the absolute position calculator 403 combines the absolute position signal x1 and the signal x1649_97 by using the following equations (36) and (37). As a result, a period number m20_97 of the signal x1649_97 and an absolute position signal (fourth position signal) x1649_1 having an accuracy of the signal x1649_97 are calculated.

$$m20\_97 = \text{ROUND}\left(\frac{97 \times x1 - x1649\_97}{2\pi}\right) \quad (36)$$

$$x1649\_1 = \frac{m20\_97 \times 2\pi + x1649\_97}{97} \quad (37)$$

In step S50_6, the absolute position calculator 503 combines the absolute position signal x1 and the signal y1649_97 by using the following equations (38) and (39). As a result, a period number m30_97 of the signal y1649_97 and an absolute position signal (fifth position signal) y1649_1 having an accuracy of the signal y1649_97 are calculated.

$$m30\_97 = \text{ROUND}\left(\frac{97 \times x1 - y1649\_97}{2\pi}\right) \quad (38)$$

$$y1649\_1 = \frac{m30\_97 \times 2\pi + y1649\_97}{97} \quad (39)$$

In step S40_8, the average processor 404 calculates an absolute position signal z1 by averaging the absolute position signals x1649_1 and y1649_1 using the following equation (40).

$$z1 = \begin{cases} \text{MOD}\left(\dfrac{x1649\_1 + y1649\_1}{2}, 2\pi\right) & \text{when } |x1649\_1 - y1649\_1| < \pi \\ \text{MOD}\left(\dfrac{x1649\_1 + y1649\_1 + 2\pi}{2}, 2\pi\right) & \text{when } |x1649\_1 - y1649\_1| \geq \pi \end{cases} \quad (40)$$

As described above, in this embodiment, the absolute position signal z1 can be accurately calculated even when the scale 10 is decentered with respect to the rotational shaft. Thereby, it becomes possible to expand the attachment allowable range.

Second Embodiment

Figure 13:
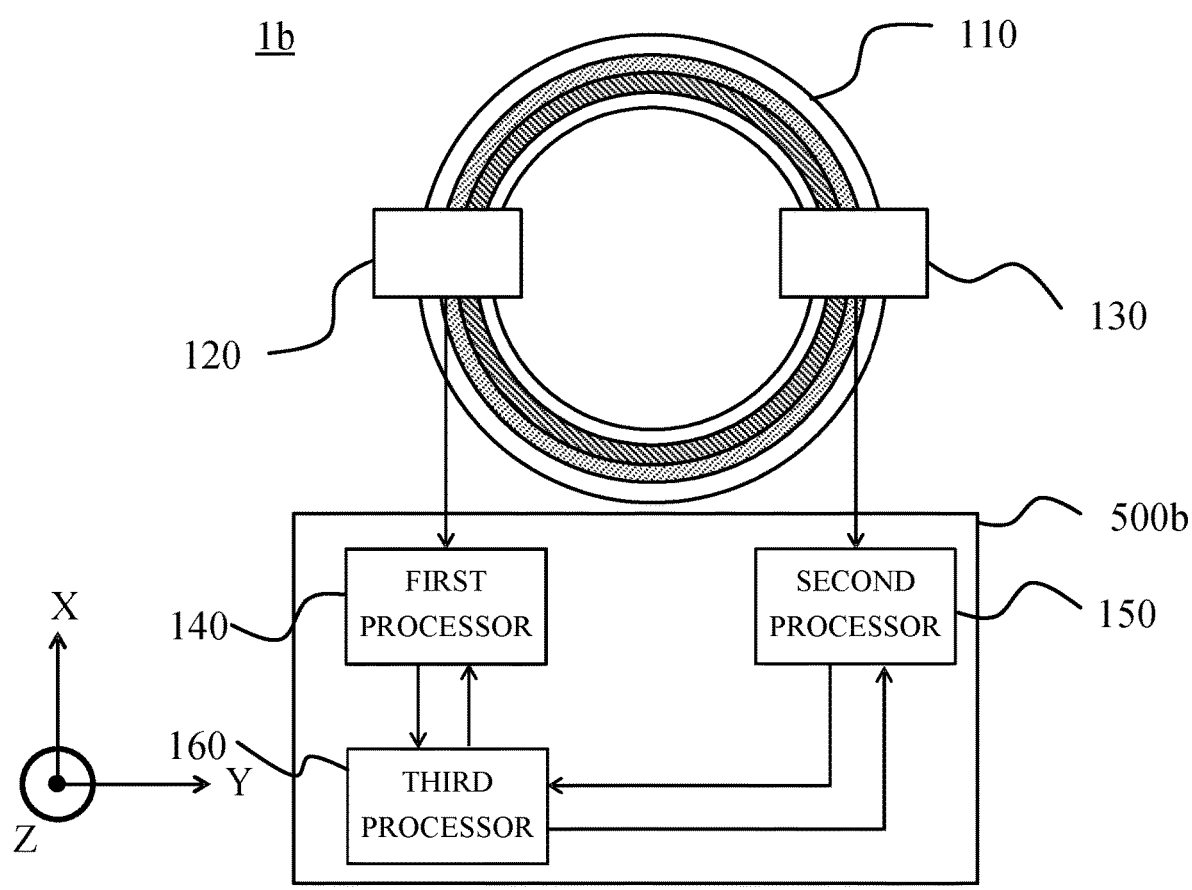
FIG. 13 is a diagram illustrating a configuration of an encoder according to the second embodiment.

FIG. 13 is a diagram illustrating a configuration of an encoder 1b according to this embodiment. The encoder 1b includes a scale 110, a sensor 120, a sensor 130, and a processor 500b. The processor 500b includes a first processor 140, a second processor 150, and a third processor 160. The encoder 1b is a reflective optical absolute rotary encoder that detects an absolute position of a movable member. In this embodiment, a case will be described in which the encoder 1b detects a rotation angle of a rotational shaft (not shown) of the movable member as the absolute position.

In this embodiment, the reflective optical absolute rotary encoder will be described as an example of the encoder 1b, but the present invention is not limited to this. The present invention can also be applied to encoders having different detection methods, for example, a transmissive optical absolute rotary encoder, a magnetic absolute rotary encoder, and an electromagnetic induction magnetic absolute rotary encoder.

Since the scale 110 and the sensors 120 and 130 are attached in the same manner as in the first embodiment, description thereof is omitted. In the following description, the description will focus on parts different from the first embodiment.

Figure 14:
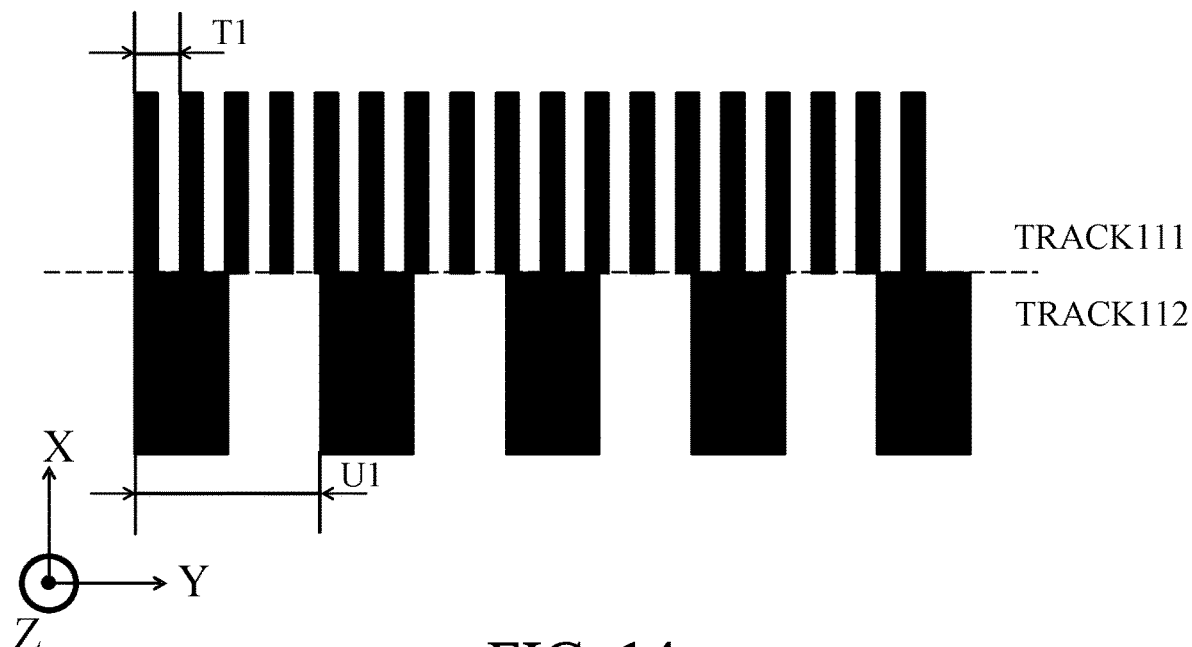
FIG. 14 is a diagram showing tracks provided on a scale according to the second embodiment.

FIG. 14 is an enlarged view of a part of the scale 110, and shows a plurality (two in this embodiment) of tracks 111 and 112 provided on the scale 110 with different diameters. In the first embodiment, each track is provided with the plurality of periodic patterns having different pitches along the scale width direction. In this embodiment, each track is provided with a periodic pattern having a predetermined pitch. Specifically, the track 111 is provided with a periodic pattern having a pitch T1. The number of gratings of the periodic pattern with the pitch T1 is 97. The track 112 is provided with a periodic pattern having a pitch U1. The number of gratings of the periodic pattern with the pitch U1 is 24.

Figure 15:
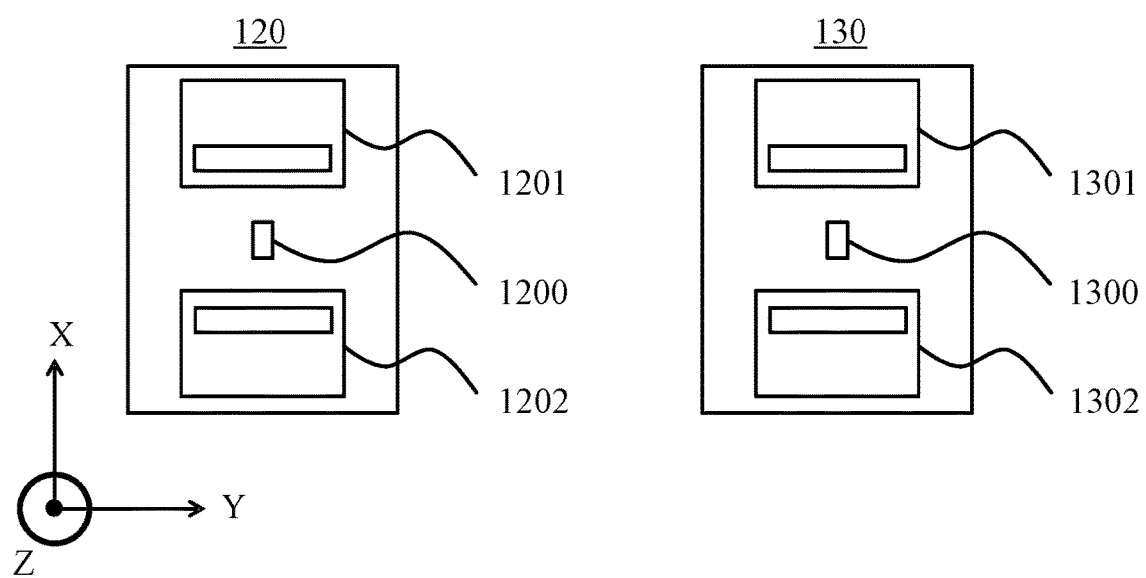
FIG. 15 is a diagram illustrating a configuration of a sensor according to the second embodiment.

FIG. 15 is a diagram illustrating a configuration of the sensors 120 and 130. The sensor 120 includes a light source 1200 and a plurality (two in this embodiment) of light-receiving portions (detectors) 1201 and 1202. The light source 1200 and the light-receiving portions 1201 and 1202 are arranged on the same plane. The light source 1200 is configured by a light-emitting element such as an LED. The light-receiving portion 1201 is configured by a plurality of photoelectric conversion elements (light-receiving elements) that photoelectrically convert light emitted from the light source 1200 and reflected by a reflection portion of the track 111. The light-receiving portion 1202 is configured by a plurality of photoelectric conversion elements (light-receiving elements) that photoelectrically convert light emitted from the light source 1200 and reflected by a reflection portion of the track 112. When the scale 110 and the sensor 120 are relatively displaced, an intensity of the reflected light received by the light-receiving elements in the light-receiving portions 1201 and 1202 changes according to the relative displacement amount. The sensor 120 outputs a sine wave signal corresponding to the change in the light-receiving intensity in the light-receiving portion 1201 and outputs a sine wave signal corresponding to the change in the light-receiving intensity in the light-receiving portion 1202. Although the configuration of the sensor 120 has been described above, the sensor 130 is described by replacing the light source 1200 described above with a light source 1300 and the light-receiving portions 1201 and 1202 with light-receiving portions 1301 and 1302.

An arrangement of the light-receiving elements of the light-receiving portion 1201 is the same as the arrangement of the light-receiving elements in FIG. 4A described in the first embodiment. A detection cycle of the light-receiving portion 1201 is always constant, and is set to a detection cycle T1 that coincides with or sufficiently close to the pitch T1. An arrangement of the light-receiving elements of the light-receiving portion 1202 is the same as the arrangement of the light-receiving elements in FIG. 4B described in the first embodiment. A detection cycle of the light-receiving portion 1202 is always constant, and is set to a detection cycle 4*T1 that coincides with or sufficiently close to the pitch U1. Although the sensor 120 has been described above, the sensor 130 is described by replacing the light source 1200 described above with 1300 and the light-receiving portions 1201 and 1202 with 1301 and 1302.

Figure 16:
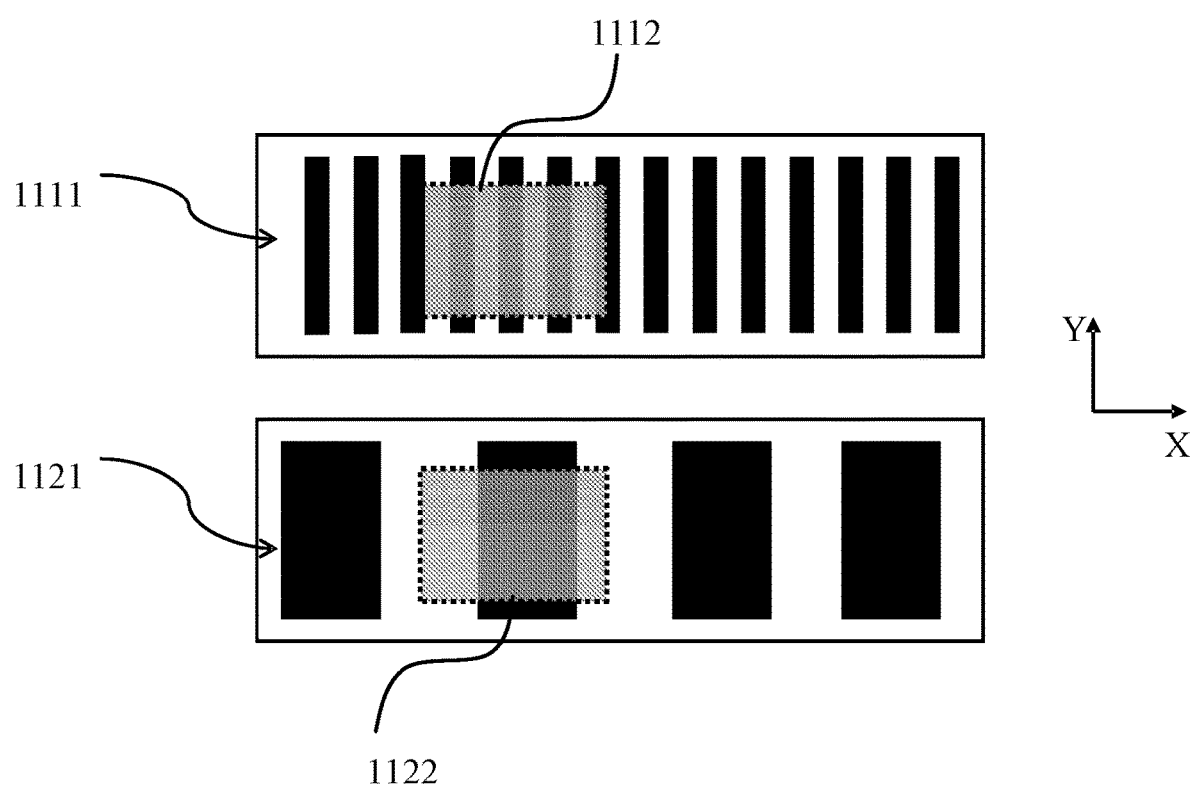
FIG. 16 is a diagram illustrating a reading area on the scale of the sensor according to the second embodiment.

FIG. 16 shows a reading area on the scale in the sensor 120. The light-receiving portion 1201 reads a pattern 1111 having the pitch T1. In this case, two-phase pseudo sine wave signals having a phase difference of about 90 degrees from each other corresponding to the pitch T1 (i.e. two-phase signals of T1) are output. The light-receiving portion 1202 reads a pattern 1121 having the pitch U1. In this case, two-phase pseudo sine wave signals having a phase difference of about 90 degrees from each other corresponding to the pitch U1 (i.e. two-phase signals of U1) are output. A reading area 1112 on the track by the light-receiving portion 1201 and a reading area 1122 on the track by the light-receiving portion 1202 are ranges in which light emitted from the light source is reflected so as to be received by each light-receiving portion. Although the sensor 120 has been described above, the sensor 130 is described by replacing the light-receiving portions 1201 and 1202 described above with 1301 and 1302.

In this embodiment, the case where two-phase signals having a phase difference of about 90 degrees from each other are output from the sensor has been described. However, a three-phase signal, a triangular wave signal, or the like may be output as long as they are signals whose phase can be detected.

Figure 17:
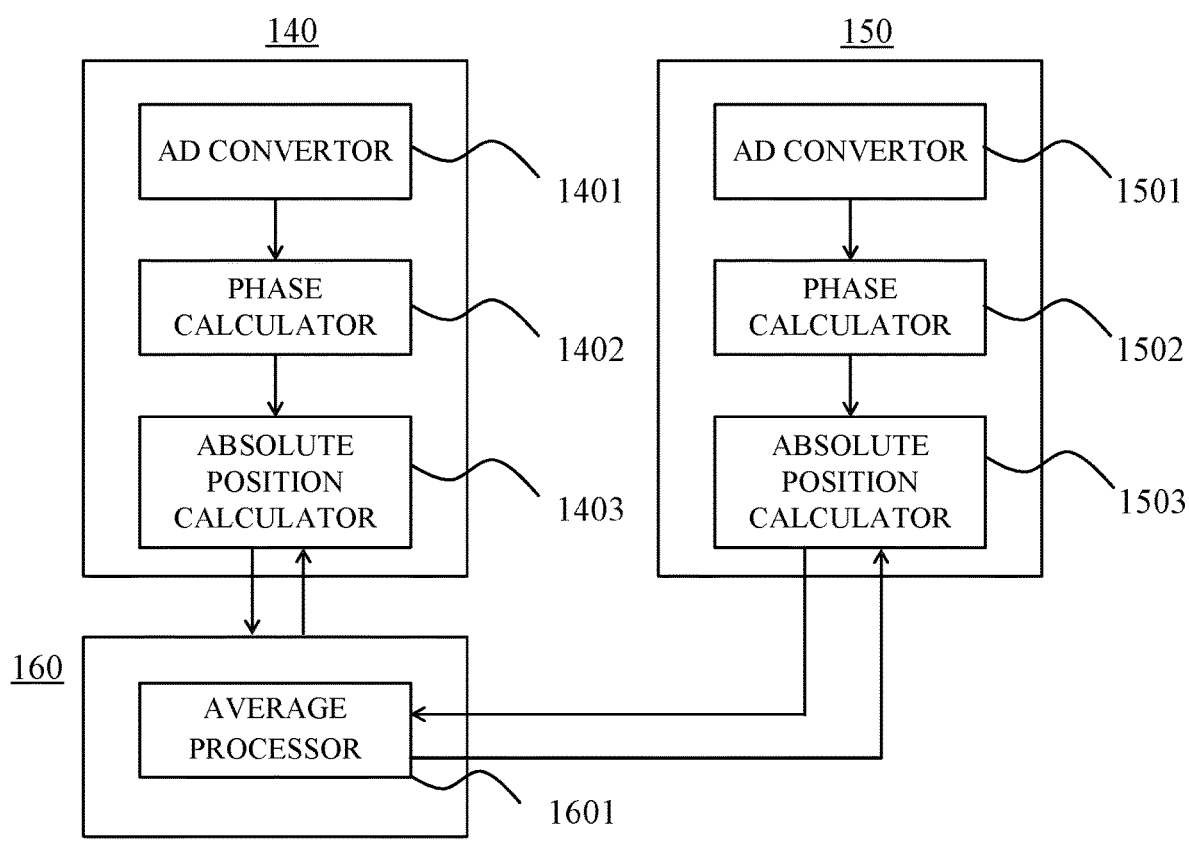
FIG. 17 is a diagram illustrating configurations of a first processor, a second processor, and a third processor according to the second embodiment.

FIG. 17 is a diagram illustrating a configuration of the first processor 140, the second processor 150, and the third processor 160. The first processor 140 includes an AD converter 1401, a phase calculator 1402, and an absolute position calculator 1403. The second processor 150 includes an AD converter 1501, a phase calculator 1502, and an absolute position calculator 1503. The third processor 160 includes an average processor 1601. Hereinafter, a process performed by the first processor 140 is referred to as a first process, a process performed by the second processor 150 is referred to as a second process, and a process performed by the third processor 160 is referred to as a third process.

Hereinafter, the first process will be described. The AD converter 1401 converts two sets of two-phase signals (two-phase signals of T1 and two-phase signals of U1) output from the light-receiving portions 1201 and 1202 into digital signals. The phase calculator 1402 calculates a phase from each two sets of two-phase signals converted into the digital signals by the AD converter 1401. Since the two-phase signals are signals having a phase difference of about 90 degrees from each other as described above, the phase calculator 1402 calculates the phase by arctan calculation. In the following description, let us assume that the phase (first periodic signal) calculated from the two-phase signals of T1 is θT97, and the phase (second periodic signal) calculated from the two-phase signals of U1 is θU24. As described above, the number of gratings in the periodic pattern with pitches T1 and U1 is 97 and 24, respectively. Therefore, the phases θT97 and θU24 are a signal of 97 periods and a signal of 24 periods, respectively.

In this embodiment, the case where the phase is calculated by the arctan calculation has been described. However, any parameter other than the phase may be calculated as long as it represents a position within a specific range.

The absolute position calculator 1403 calculates an absolute position by multiplying the phases θT97 and θU24 by an integer. In this embodiment, the absolute position calculator 1403 first multiplies the phase θU24 by 4 to calculate a phase of the period 96. Next, the absolute position calculator 1403 calculates a signal (first position signal) x120 of one period around the entire track circumference from the phase difference between the phase θT97 and the phase θU24 multiplied by four using the following equation (41).

$$x120 = \text{MOD}(\theta T97 - 4 \times \theta U24, 2\pi) \tag{41}$$

Hereinafter, the second process will be described. The AD converter 1501 converts two sets of two-phase signals (two-phase signals of T1 and two-phase signals of U1) output from the light-receiving portions 1301 and 1302 into digital signals. The phase calculator 1502 calculates a phase from each two sets of two-phase signals converted into the digital signals by the AD converter 1501. Since the two-phase signals are signals having a phase difference of about 90 degrees from each other as described above, the phase calculator 1502 calculates the phase by the arctan calculation. In the following description, let us assume that the phase (third periodic signal) calculated from the two-phase signals of T1 is θV97, and the phase (fourth periodic signal) calculated from the two-phase signals of U1 is θW24. As described above, the number of gratings in the periodic pattern with pitches T1 and U1 is 97 and 24, respectively. Therefore, the phases θV97 and θW24 are a signal of 97 periods and a signal of 24 periods, respectively.

The absolute position calculator 1503 calculates an absolute position by multiplying the phases θV97 and θW24 by an integer. In this embodiment, the absolute position calculator 1503 first multiplies the phase θW24 by 4 to calculate a phase of the period 96. Next, the absolute position calculator 1503 calculates a signal (second position signal) x130 of one period around the entire track circumference from the phase difference between the phase θV97 and the phase θW24 multiplied by four using the following equation (42).

$$x130 = \text{MOD}(\theta V97 - 4 \times \theta W24, 2\pi) \tag{42}$$

Hereinafter, the third process will be described. The average processor 1601 first acquirers an absolute position signal (third position signal) x1 from the signals x120 and x130 using the following equation (43). By performing this process, it is possible to improve the decentering fluctuation tolerance. Since the improvement of the decentering fluctuation tolerance has been described in the first embodiment, the description thereof is omitted in this embodiment.

$$x1 = \begin{cases} \text{MOD}\left(\dfrac{x120 + x130}{2}, 2\pi\right) & \text{when } x120 < x130 \\ \text{MOD}\left(\dfrac{x120 + x130 + 2\pi}{2}, 2\pi\right) & \text{when } x120 \geq x130 \end{cases} \tag{43}$$

Next, the absolute position calculator 1403 and 1503 process the absolute position signal x1, and calculate an absolute position signal with higher accuracy. Specifically, the absolute position calculator 1403 combines the absolute position signal x1 and the phase θT97 by using the following equations (44) and (45). As a result, a period number m120_97 of the phase θT97 and an absolute position signal (fourth position signal) x97_1 having an accuracy of the phase θT97 are calculated.

$$m120\_97 = \text{ROUND}\left(\dfrac{97 \times x1 - \theta T97}{2\pi}\right) \tag{44}$$

$$x97\_1 = \dfrac{m120\_97 \times 2\pi + \theta T97}{97} \tag{45}$$

Similarly, the absolute position calculator 1503 combines the absolute position signal x1 and the phase θV97 by using the following equations (46) and (47). As a result, a period number n120_97 of the phase θV97 and an absolute position signal (fifth position signal) y97_1 having an accuracy of the phase θV97 are calculated.

$$n120\_97 = \text{ROUND}\left(\dfrac{97 \times x1 - \theta V97}{2\pi}\right) \tag{46}$$

$$y97\_1 = \dfrac{n120\_97 \times 2\pi + \theta V97}{97} \tag{47}$$

Finally, the average processor 1601 acquirers an absolute position signal z1 by averaging the absolute position signals x97_1 and y97_1 by using the following equation (48).

$$z1 = \begin{cases} \text{MOD}\left(\dfrac{x97\_1 + y97\_1}{2}, 2\pi\right) & \text{when } |x97\_1 - y97\_1| < \pi \\ \text{MOD}\left(\dfrac{x97\_1 + y97\_1 + 2\pi}{2}, 2\pi\right) & \text{when } |x97\_1 - y97\_1| \geq \pi \end{cases} \tag{48}$$

As described above, in this embodiment, the absolute position signal z1 can be accurately calculated even when the scale 110 is decentered with respect to the rotational shaft. Thereby, it becomes possible to expand the attachment allowable range.

Third Embodiment

Figure 18:
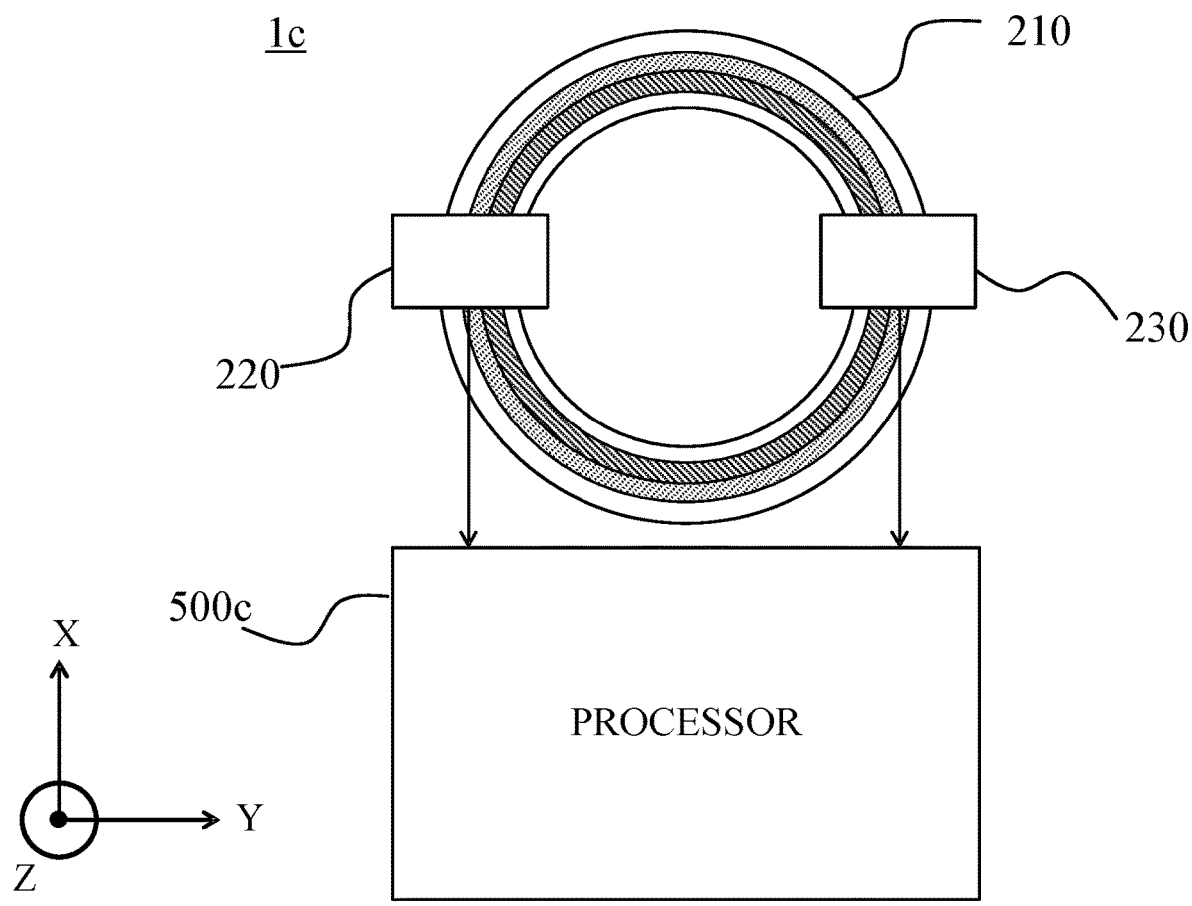
FIG. 18 is a diagram illustrating a configuration of an encoder according to the third embodiment.
Figure 19:
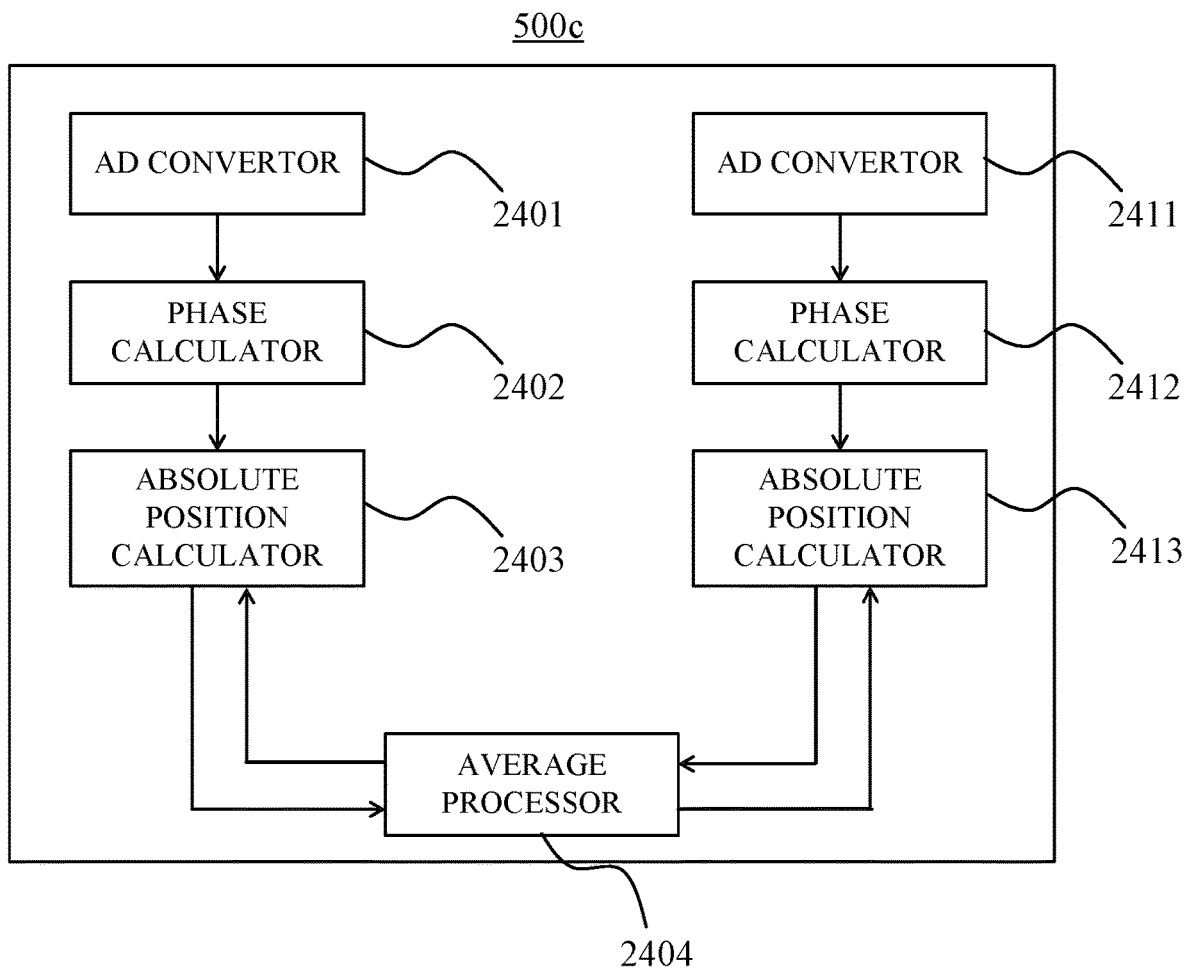
FIG. 19 is a diagram illustrating a configuration of a processor according to the third embodiment.

FIG. 18 is a diagram illustrating a configuration of an encoder 1c according to this embodiment. The encoder 1c includes a scale 210, a sensor 220, a sensor 230, and a processor 500c. Since a configuration and attachment of the scale 210 and the sensors 220 and 230 are the same as those in the first embodiment or the second embodiment, the description thereof is omitted. In this embodiment, parts different from the first and second embodiments will be described. FIG. 19 is a diagram illustrating a configuration of the processor 500c. The processor 500c includes AD converters 2401 and 2411, phase calculators 2402 and 2412, absolute position calculators 2403 and 2413, and an average processor 2404. The processor 500c executes all of the first process, the second process, and the third process described in the second embodiment. A method for acquiring an absolute position signal is the same as that in the second embodiment, and thus the description thereof is omitted.

Fourth Embodiment

Figure 20:
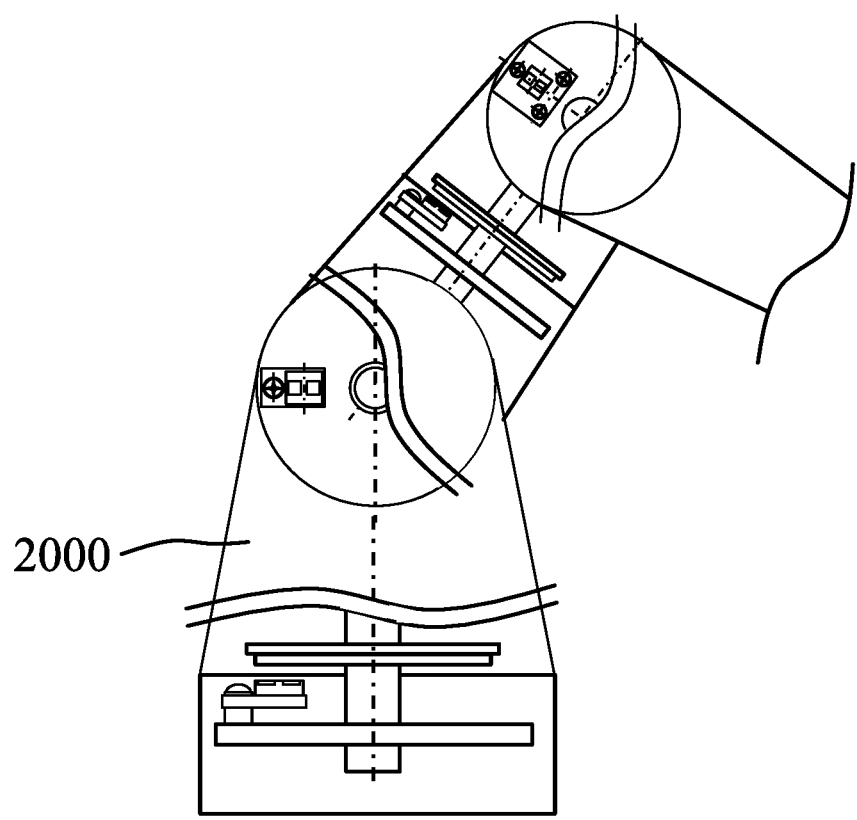
FIG. 20 is a diagram illustrating a robot arm according to the fourth embodiment.

In this embodiment, an example of an apparatus equipped with the encoder of the present invention described in the first to third embodiments will be described. FIG. 20 is a diagram illustrating a robot arm 2000 equipped with the encoder 1a described in the first embodiment. In the robot arm 2000, the encoder 1a is attached to each shaft and used to detect an absolute rotation position of each shaft. The scale 10 is attached to a movable member that rotates in each shaft. The movable member is rotated by an actuator (not shown). When the movable member rotates to drive the robot arm 2000, the encoder 1a detects the absolute rotation position of each shaft of the robot arm 2000 and outputs position information to a CPU (not shown). The CPU drives the actuator based on the position information and moves the robot arm 2000 to a target position.

The encoder of the present invention is not limited to the robot arm 2000 but can be used in various applications of various apparatuses such as position detection of a print head and paper feed roller of a printer (optical apparatus), and rotation position detection of a photosensitive drum of a copying machine (optical apparatus) and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-226384, filed on Dec. 3, 2018 which is hereby incorporated by reference herein in its entirety.

What is claimed is:

1. An absolute rotary encoder comprising:
a scale on which a first track and a second track are provided with different diameters from each other;
a first sensor configured to move relative to the scale and read the first track and the second track;
a second sensor arranged so as to face the first sensor in a radial direction of the scale and configured to move relative to the scale and read the first track and the second track; and
a processor configured to generate a first position signal by taking a difference between a first periodic signal based on a signal obtained by reading the first track by the first sensor and a second periodic signal based on a signal obtained by reading the second track by the first sensor, and generates a second position signal by taking a difference between a third periodic signal based on a signal obtained by reading the first track by the second sensor and a fourth periodic signal based on a signal obtained by reading the second track by the second sensor,
wherein the processor averages the first position signal and the second position signal to generate a third position signal, combines the third position signal and the first periodic signal to generate a fourth position signal, combines the third position signal and the third periodic signal to generate a fifth position signal, and averages the fourth position signal and the fifth position signal to generate an absolute position signal indicating an absolute position of at least one of the scale, the first sensor, or the second sensor.

2. The absolute rotary encoder according to claim 1, wherein the processor includes
a first processor configured to generate the first position signal and the absolute position signal and
a second processor configured to generate the second position signal.

3. The absolute rotary encoder according to claim 1, wherein the processor includes
a first processor configured to generate the first position signal,
a second processor configured to generate the second position signal, and
a third processor configured to generate the absolute position signal.

4. The absolute rotary encoder according to claim 1, wherein the processor
generates the first position signal by taking a difference between the first periodic signal multiplied by an integer and the second periodic signal multiplied by an integer, and
generates the second position signal by taking a difference between the third periodic signal multiplied by an integer and the fourth periodic signal multiplied by an integer.

5. The absolute rotary encoder according to claim 1, wherein
the first track includes a first periodic pattern and a second periodic pattern which have different periods from each other,
the second track includes a third periodic pattern having a period different from those of the first and second periodic patterns and a fourth periodic pattern having a period different from those of the first to third periodic patterns, and
the processor generates
the first periodic signal by processing a signal corresponding to each of the first and second periodic patterns and
the second periodic signal by processing a signal corresponding to each of the third and fourth periodic patterns.

6. The absolute rotary encoder according to claim 1, wherein each of the first sensor and the second sensor includes detectors having different detection cycles.

7. The absolute rotary encoder according to claim 1, wherein each of the first sensor and the second sensor includes detectors which are capable of switching a detection cycle.

8. The absolute rotary encoder according to claim 1, wherein an opposing arrangement angle between the first sensor and the second sensor is set within a range in which a rounding error indicating a reliability of the absolute position does not exceed a threshold.

9. The absolute rotary encoder according to claim 8, wherein the threshold is 0.4.

10. An apparatus comprising:
a movable member configured to rotate; and
an absolute rotary encoder configured to detect a rotation position of the movable member,
wherein the absolute rotary encoder comprising:
   a scale on which a first track and a second track are provided with different diameters from each other;
   a first sensor configured to move relative to the scale and read the first track and the second track;
   a second sensor arranged so as to face the first sensor in a radial direction of the scale and configured to move relative to the scale and read the first track and the second track; and
   a processor configured to generate a first position signal by taking a difference between a first periodic signal based on a signal obtained by reading the first track by the first sensor and a second periodic signal based on a signal obtained by reading the second track by the first sensor, and generates a second position signal by taking a difference between a third periodic signal based on a signal obtained by reading the first track by the second sensor and a fourth periodic signal based on a signal obtained by reading the second track by the second sensor,
wherein the processor averages the first position signal and the second position signal to generate a third position signal, combines the third position signal and the first periodic signal to generate a fourth position signal, combines the third position signal and the third periodic signal to generate a fifth position signal, and averages the fourth position signal and the fifth position signal to generate an absolute position signal indicating an absolute position of at least one of the scale, the first sensor, or the second sensor.

* * * * *